US010547777B2

(12) United States Patent
Shibata et al.

(10) Patent No.: US 10,547,777 B2
(45) Date of Patent: Jan. 28, 2020

(54) CAMERA SHOOTING INFORMATION GENERATION APPARATUS, CAMERA SHOOTING INFORMATION GENERATION METHOD, IMAGING APPARATUS, FRAME DATA SEARCH APPARATUS, AND AUTOMATIC TRACKING CAMERA SHOOTING SYSTEM

(71) Applicant: Soliton Systems, K.K., Tokyo (JP)

(72) Inventors: Yoshiaki Shibata, Tokyo (JP); Nobuo Kamata, Tokyo (JP)

(73) Assignee: SOLITON SYSTEMS K.K., Tokyo (JP)

( * ) Notice: Subject to any disclaimer, the term of this patent is extended or adjusted under 35 U.S.C. 154(b) by 52 days.

(21) Appl. No.: 15/908,518

(22) Filed: Feb. 28, 2018

(65) Prior Publication Data
US 2018/0255233 A1    Sep. 6, 2018

(51) Int. Cl.
*H04N 5/232* (2006.01)
*H04N 5/77* (2006.01)
(Continued)

(52) U.S. Cl.
CPC .......... *H04N 5/23216* (2013.01); *H04N 5/77* (2013.01); *H04N 7/08* (2013.01); *G01S 19/14* (2013.01); *G01S 19/42* (2013.01)

(58) Field of Classification Search
CPC ........ H04N 5/23216; H04N 5/77; H04N 7/08; H04N 5/23206; H04N 5/23299; H04N 9/8205; G01S 19/14; G01S 19/42
See application file for complete search history.

(56) References Cited

FOREIGN PATENT DOCUMENTS

| JP | 4529304 B2 | 8/2010 |
|----|------------|--------|
| JP | 2012151873 A | 8/2012 |

OTHER PUBLICATIONS

"SMPTE Standard; Unique Material Identifier (UMID)," The Society of Motion Picture and Television Engineers (SMPTE), 26 pages, (2011). [Author Unknown].
(Continued)

*Primary Examiner* — Anner N Holder
(74) *Attorney, Agent, or Firm* — Alston & Bird LLP

(57) ABSTRACT

A camera shooting information generation apparatus generates extended UMID data having basic UMID data serving as a unique identifier identifying material data globally uniquely, and a source pack including information on altitude, longitude, and latitude, each of which is constituted of 8 nibbles, wherein first to fifth nibbles of the altitude indicate last 5 digits of a value of an altitude relative to the sea level of the local geoid, an eighth nibble of the altitude indicates whether the altitude relative to the sea level of the local geoid has a positive value or a negative value and a description target of the source pack, a seventh nibble of the altitude indicates: the number of GPS satellites each serving as a transmission source of a signal received when a camera shooting position of an imaging apparatus is detected; a first flag indicating whether a supportive apparatus is used when the camera shooting position is detected; and a second flag indicating which one of the first digit of the value of the altitude relative to the sea level of the local geoid and a PDOP value of the detected camera shooting position is specified at a sixth nibble of the altitude, and the sixth nibble of the altitude indicates either the first digit of the value of the altitude or the PDOP value. The camera shooting information generation apparatus includes a fixed value setting unit configured to invalidate a value set as the PDOP value at the sixth nibble by setting, at the seventh nibble, a first fixed value which indicates: the number of the GPS satellites being no more than two; and the flag indicating the PDOP (Continued)

value being specified at the sixth nibble, and which is unused in a format specification of the extended UMID data, a camera shooting azimuth setting unit configured to set a value of a camera shooting azimuth of the imaging apparatus at the sixth nibble, an altitude setting unit configured to set a value of the altitude relative to the sea level of the local geoid, and an extended UMID data generation unit configured to generate the extended UMID data in which values are set by the fixed value setting unit, the camera shooting azimuth setting unit, and the altitude setting unit.

7 Claims, 17 Drawing Sheets

(51) Int. Cl.
  *H04N 7/08* (2006.01)
  *G01S 19/14* (2010.01)
  *G01S 19/42* (2010.01)

(56) References Cited

OTHER PUBLICATIONS

Shibata et al., "To Maximize Interoperability in Mobile News Gathering," Soliton Systems K.K., NAB Show 2017 Broadcast Engineering and Information Technology Conference, 12 pages, (2017).

CAMERA SHOOTING INFORMATION GENERATION APPARATUS, CAMERA SHOOTING INFORMATION GENERATION METHOD, IMAGING APPARATUS, FRAME DATA SEARCH APPARATUS, AND AUTOMATIC TRACKING CAMERA SHOOTING SYSTEM

CROSS-REFERENCE TO RELATED APPLICATIONS

The present application claims the benefit of Japanese Patent Application No. 2017-000001, filed on Jan. 1, 2017, which is incorporated herein by reference in its entirety.

BACKGROUND OF THE INVENTION

Field of the Invention

The present invention relates to a camera shooting information generation apparatus, a camera shooting information generation method, an imaging apparatus, a frame data search apparatus, and an automatic tracking camera shooting system.

Description of the Related Art

In order to uniquely identify material data including video data, audio data, or audiovisual data in which the video data and the audio data are synchronized, various technologies for attaching a unique identifier to each material data are proposed. One of the technologies for attaching the unique identifier to the material data is unique material identifier (UMID) developed as a global standard technology by the Society of Motion Picture & Television Engineers (SMPTE) (see SMPTE ST330).

SMPTE ST330 specifies the format specification of each of basic UMID data constituted as a unique identifier of material data, and extended UMID data obtained by extending the basic UMID data. In the extended UMID data, it is possible to describe not only information which can be described in the basic UMID data but also information as to "when", "where", and "who" to generate original material data for the first time by camera shooting.

There is disclosed a technology for describing identification information and altitude information acquired from the outside by using "where" information of the extended UMID data (see Japanese Patent Application Publication No. 2002-271395). In the technology in Japanese Patent Application Publication No. 2002-271395, as the "where" information of the extended UMID data, the altitude information is described in addition to latitude information and longitude information at the time of camera shooting, and the identification information which determines whether the above altitude information indicates a distance from the center of the Earth or a distance from the surface of an Earth ellipsoid measured by using predetermined geodetic coordinate systems is described in part of the altitude information.

In addition, there is disclosed a technology for acquiring a camera shooting position periodically during the shooting and, in the case where the acquired camera shooting position is apart from a previously acquired camera shooting position by a predetermined distance, for recording information on the acquired camera shooting position together with a downsized still image (thumbnail) in a video at the camera shooting position as metadata (see Japanese Patent Application Publication No. 2012-151873).

The present invention is proposed in view of the above circumstances.

SUMMARY OF THE INVENTION

A camera shooting information generation apparatus which is a first aspect of the present invention is a camera shooting information generation apparatus for generating extended UMID data, the extended UMID data having basic UMID data serving as a unique identifier identifying material data globally uniquely, and a source pack including information on altitude, longitude, and latitude, each of which is constituted of 8 nibbles, wherein first to fifth nibbles of the altitude indicates last 5 digits of a value of an altitude relative to the sea level of the local geoid, an eighth nibble of the altitude indicates whether the altitude relative to the sea level of the local geoid has a positive value or a negative value and a description target of the source pack, a seventh nibble of the altitude indicates: the number of GPS (global positioning system) satellites each serving as a transmission source of a signal received when a camera shooting position of an imaging apparatus is detected; a first flag indicating whether a supportive apparatus is used when the camera shooting position is detected; and a second flag indicating which one of a first digit of the value of the altitude relative to the sea level of the local geoid and a PDOP (position dilution of precision) value of the detected camera shooting position is specified at a sixth nibble of the altitude, the sixth nibble of the altitude indicates either the first digit of the value of the altitude or the PDOP value according to the second flag, the camera shooting information generation apparatus including a fixed value setting unit configured to invalidate a value set as the PDOP value at the sixth nibble by setting a first fixed value at the seventh nibble, wherein the first fixed value indicates: the number of the GPS satellites being no more than two; and the second flag indicating that the PDOP value is specified at the sixth nibble, and the first fixed value is unused in a format specification of the extended UMID data, a camera shooting azimuth setting unit configured to set a value of a camera shooting azimuth of the imaging apparatus at the sixth nibble, an altitude setting unit configured to set a value of the altitude relative to the sea level of the local geoid, and an extended UMID data generation unit configured to generate the extended UMID data in which the values are set by the fixed value setting unit, the camera shooting azimuth setting unit, and the altitude setting unit.

A camera shooting information generation method which is a second aspect of the present invention is a camera shooting information generation method for generating extended UMID data, the extended UMID data having basic UMID data serving as a unique identifier identifying material data globally uniquely, and a source pack including information on altitude, longitude, and latitude, each of which is constituted of 8 nibbles, wherein first to fifth nibbles of the altitude indicates last 5 digits of a value of an altitude relative to the sea level of the local geoid, an eighth nibble of the altitude indicates whether the altitude relative to the sea level of the local geoid has a positive value or a negative value and a description target of the source pack, a seventh nibble of the altitude indicates: the number of GPS (global positioning system) satellites each serving as a transmission source of a signal received when a camera shooting position of an imaging apparatus is detected; a first flag indicating whether a supportive apparatus is used when the camera shooting position is detected; and a second flag indicating which one of a first digit of the value of the altitude relative to the sea level of the local geoid and a PDOP (position dilution of precision) value of the detected camera shooting position is specified at a sixth nibble of the altitude, the sixth nibble of the altitude indicates either the first digit of the value of the altitude or the PDOP value according to the second flag, the camera shooting information generation method including invalidating a value set as the PDOP value at the sixth nibble by setting a first fixed value at the seventh nibble, wherein the first fixed value indicates: the number of the GPS satellites being no more than two; and the flag indicating that the PDOP value is specified at the sixth nibble, and the first fixed value is unused in a format specification of the extended UMID data, setting a value of a camera shooting azimuth of the imaging apparatus at the sixth nibble, setting a value of the altitude relative to the sea level of the local geoid, and generating the extended UMID data in which the first fixed value, and the values of the camera shooting azimuth and the value of the altitude relative to the sea level of the local geoid are set.

An imaging apparatus which is a third aspect of the present invention is an imaging apparatus including an imaging unit configured to image a subject and generate frame sequence data having a plurality of frames, the camera shooting information generation apparatus, and a data interleaving unit configured to interleave extended UMID data generated by the camera shooting information generation apparatus and the frame sequence data generated by the imaging unit, and to output the frame sequence data.

A frame data search apparatus which is a fourth aspect of the present invention is a frame data search apparatus including a time information extraction unit configured to extract time information included in a source pack from extended UMID data generated by a camera shooting information generation apparatus, a camera shooting direction parameter calculation unit configured to calculate a camera shooting direction parameter of an imaging apparatus having generated a frame, to which the extended UMID data is attached, based on a value of a camera shooting azimuth and a value of a camera shooting elevation angle included in the extended UMID data, a distance calculation unit configured to calculate, based on the camera shooting direction parameter calculated by the camera shooting direction parameter calculation unit, the time information extracted by the time information extraction unit, and time series data of a position of a subject imaged by the imaging apparatus, a distance from the position of the subject to a line indicative of a camera shooting direction of the imaging apparatus, and a determination unit configured to determine that the subject is imaged in, among a plurality of frames of frame sequence data generated by the imaging apparatus, a frame in a case where the distance calculated by the distance calculation unit falls within a predetermined range obtained based on a camera shooting angle of view of the imaging apparatus.

An automatic tracking camera shooting system which is a fifth aspect of the present invention is an automatic tracking camera shooting system including an imaging system having an imaging apparatus configured to image a subject and generate frame sequence data having a plurality of frames and a camera shooting information generation apparatus, a camera shooting direction control apparatus configured to control a camera shooting azimuth and a camera shooting elevation angle of the imaging apparatus, based on camera shooting direction control data, and a camera shooting information analysis control apparatus including a camera shooting direction vector calculation unit configured to calculate a camera shooting direction vector indicative of a camera shooting direction of the imaging apparatus, based on a value of the camera shooting azimuth and a value of the camera shooting elevation angle included in extended UMID data generated by the camera shooting information generation apparatus, a position direction vector calculation unit configured to calculate a position direction vector indicative of a position direction of the subject relative to a camera shooting position of the imaging apparatus, based on altitude, longitude, and latitude included in the extended UMID data generated by the camera shooting information generation apparatus and position information of the subject in a geographic coordinate system, and a camera shooting direction control data generation supply unit configured to generate the camera shooting direction control data for controlling the camera shooting azimuth and the camera shooting elevation angle of the imaging apparatus such that a difference between the calculated camera shooting direction vector and the calculated position direction vector is reduced, and to supply the generated camera shooting direction control data to the camera shooting direction control apparatus.

DESCRIPTION OF THE PREFERRED EMBODIMENTS

Embodiments of the present invention will be described in detail with reference to the drawings.

First Embodiment

Figure 1:
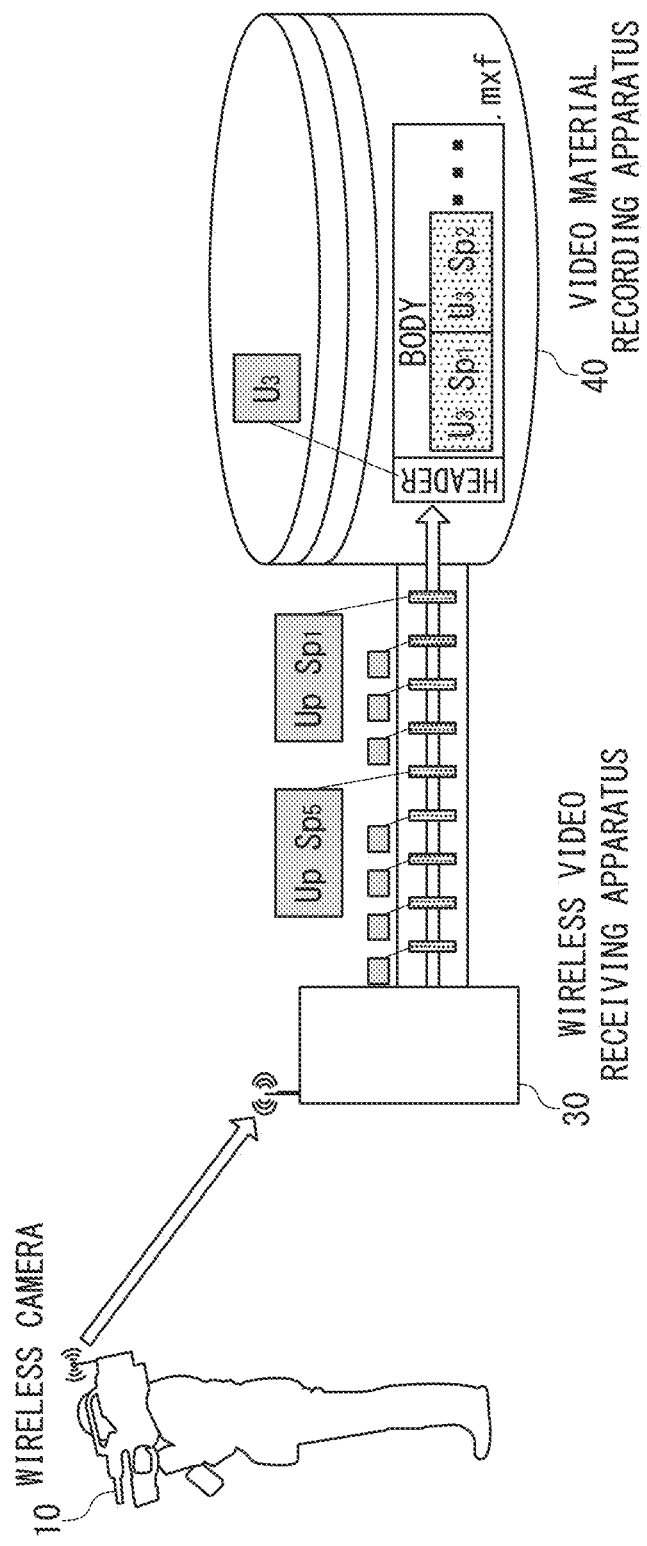
FIG. 1 is a schematic configuration diagram of a video shooting and recording system.

FIG. 1 is a schematic configuration diagram of a video shooting and recording system 1. The video shooting and recording system 1 includes a wireless camera 10 which shoots a subject while moving and wirelessly transmits material data, a wireless video receiving apparatus 30 which receives the material data from the wireless camera 10, and a video material recording apparatus 40 which receives serial digital interface (SDI) data transmitted from the wireless video receiving apparatus 30 and records the SDI data as a material exchange format (MXF) file.

The wireless camera 10 shoots the subject to generate the material data, and also generates extended UMID data serving as an identifier for uniquely identifying the material data. The wireless camera 10 interleaves the extended UMID data into the generated material data, and wirelessly transmits the material data to the wireless video receiving apparatus 30.

The wireless video receiving apparatus 30 receives the material data from the wireless camera 10, and outputs the material data as frame-by-frame SDI data. The video material recording apparatus 40 receives the frame-by-frame SDI data, cuts out a desired portion of an obtained frame sequence, and records the desired portion thereof as the MXF file.

Figure 2:
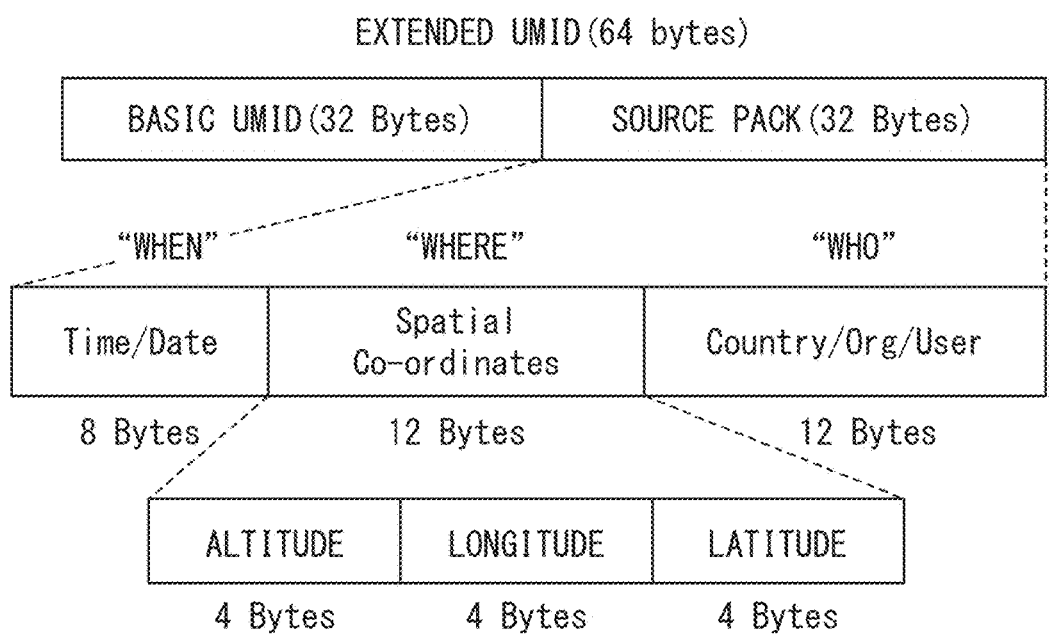
FIG. 2 is a view showing the structure of extended UMID data to be interleaved into material data.

FIG. 2 is a view showing the structure of the extended UMID data to be interleaved into the material data. The extended UMID data was developed as a global standard technology by the Society of Motion Picture & Television Engineers (SMPTE) ST330, and uniquely identifies the material data to which the extended UMID data is attached. Specifically, the extended UMID data is 64-byte data, and is constituted by 32-byte basic UMID data and a 32-byte source pack.

The basic UMID data is a unique identifier for identifying the material data globally (temporally and spatially) uniquely.

The source pack indicates a situation when the material data was originally generated, and is constituted by three elements which represent "when", "where", and "who" to generate the original material data for the first time by camera shooting. Specifically, the source pack is constituted by the individual elements which are a "Time/Date" element representing "when" (8 bytes), a "Spatial Co-ordinates" element representing "where" (12 bytes), and a "Country/Org/User" element representing "who" (12 bytes). The "Spatial Co-ordinates" element is further constituted by three elements which are an "altitude" part (4 bytes), a "longitude" part (4 bytes), and a "latitude" part (4 bytes).

Figure 3:
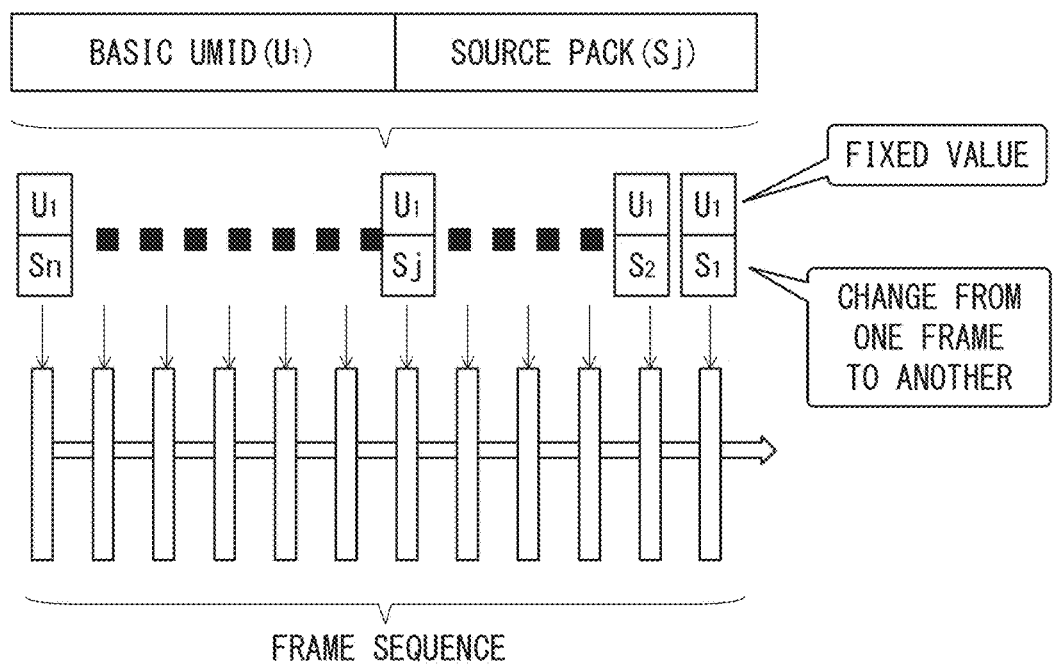
FIG. 3 is a view schematically showing the relationship between the material data constituted as a sequence of frames and the extended UMID data.

FIG. 3 is a view schematically showing the relationship between the material data constituted as a sequence of frames and the extended UMID data.

In the case where the material data is a video, the material data serving as the identification target of the UMID data is defined as a bounded sequence of frames constituted by a plurality of finite frames. The extended UMID data is then attached to each of the frames included in the bounded sequence of frames.

The basic UMID data included in the extended UMID data globally uniquely identifies the bounded sequence of frames as a whole as one material data, and therefore, the same value (e.g., U1) is set for all of the frames in the bounded sequence of frames. Consequently, the value set for the basic UMID data differs when the bounded sequence of frames differs.

On the other hand, the source pack is used for identifying each frame included in a given bounded sequence of frames, and therefore, the value of the source pack differs from one frame to another. For example, in the "Time/Date" element of the source pack, time information representing "when" with a temporal resolution smaller than the reciprocal of frame rate is to be set. In addition, in the case where the material data is generated by the wireless camera 10 which moves at high speed, in the "Spatial Co-ordinates" element of the source pack, information representing "where" having a value which differs from one frame to another is to be set.

Accordingly, the extended UMID data has a hierarchical structure. That is, in the case where the material data constituted as the bounded sequence of frames is uniquely identified as a whole, the basic UMID data is used. On the other hand, in the case where each frame constituting the material data is uniquely identified, the combination of the basic UMID data and the source pack, i.e., the extended UMID data, is used.

Note that, in FIG. 3, the description has been given of the case where the extended UMID data is attached to the material data, but only the basic UMID data may be used instead of the extended UMID data. In this case, however, the basic UMID data can uniquely identify the material data constituted as the bounded sequence of frames only as a whole. In other words, the basic UMID data cannot uniquely identify each frame constituting the material data.

In order to generate the extended UMID data constituted in the manner described above, the wireless camera 10 shown in FIG. 1 is equipped with various sensors. When an operation of start/end of camera shooting is executed a plurality of times, the wireless camera 10 generates the bounded sequence of frames constituted by a plurality of frames at every time the operation is executed, and also generates the extended UMID data based on pieces of information obtained from various sensors. The wireless camera 10 attaches the extended UMID data to each frame of the frame sequence, and transmits the frame sequence to the wireless video receiving apparatus 30.

The wireless camera 10 treats each bounded sequence of frames generated at every time the operation of start/end of camera shooting is executed as independent material data, and thus attaches different pieces of the basic UMID data, each of which is newly generated at the point of the operation of start of camera shooting, to the individual bounded sequences of frames in order to globally uniquely identify the bounded sequences of frames.

Note that the attachment of the basic UMID data is not limited to the above example. For example, it is possible to consider that the wireless camera 10 does not generate a plurality of the material data, each of which is predefined as the bounded sequence of frames, but generates a single continuous frame sequence which is unbounded, including a non-camera shooting period (a period from the end of the previous camera shooting to the start of the next camera shooting). In this case, the wireless camera 10 may use, as the basic UMID data Up shown in FIG. 1, a value which is newly generated when the wireless camera 10 is powered on, or a value which is newly generated when the wireless camera 10 starts the camera shooting first.

In addition, it is also possible to consider that the wireless camera 10 generates a single unbounded continuous frame sequence even including a power off period (a period from power-off after the end of the previous camera shooting to power-on for the next camera shooting). In this case, the wireless camera 10 may use, as the basic UMID data Up, a fixed value which is pre-assigned in order to globally uniquely identify the wireless camera 10 itself.

As will be described in detail later, the source pack Sp (Sp1, Sp5) of the extended UMID data shown in FIG. 1 is generated based on pieces of information obtained from various sensors of the wireless camera 10.

The wireless video receiving apparatus 30 receives the frame sequence from the wireless camera 10 by wireless communication, and shapes the received frame sequence based on an SDI specification. Specifically, the wireless video receiving apparatus 30 stores the extended UMID data attached to each frame of the incoming frame sequence into a vertical ancillary data (VANC) area provided at each frame of the SDI output frame without modifying the extended UMID data itself, and outputs the SDI data.

The video material recording apparatus 40 cuts out a desired portion of the incoming SDI data from the wireless video receiving apparatus 30, converts the SDI data which has been cut out to an MXF file, and records the MXF file. The MXF file recorded in the video material recording apparatus 40 is treated as one material data which is newly generated.

The MXF file recorded in the video material recording apparatus 40 is an audiovisual file in which audiovisual data is stored based on a predetermined file format, and is constituted by an MXF header and an MXF body.

The MXF header stores the basic UMID data (U3 in the case of FIG. 1) which is newly generated in order to globally uniquely identify the MXF file as a whole as one material data.

The MXF body stores each frame constituting the bounded sequence of frames, which is cut out from the incoming SDI data and recorded as the MXF file, together with the extended UMID data being attached to each frame.

The basic UMID data in the extended UMID data attached to each frame stored in the MXF body has the same value as that of the basic UMID data stored in the MXF header. The reason therefor is as follows.

The identification target of the basic UMID data in the extended UMID data attached to each frame stored in the MXF body is one material data constituted as the bounded sequence of frames stored in the MXF file as a whole. On the other hand, the identification target of the basic UMID data stored in the MXF header is another material data represented as the MXF file. However, the basic UMID data stored in the MXF header and the basic UMID data stored in the MXF body via the extended UMID data share the same material data as the identification target, i.e., the bounded sequence of frames stored in the MXF file, and hence the basic UMID data in the MXF header and the basic UMID data in the MXF body have the same value.

The source pack in the extended UMID data attached to each frame stored in the MXF body holds the value of the source pack, which was attached to each frame of the incoming frame sequence of the SDI data, without modifying the value. The reason therefor is that the source pack is the information indicating "when", "where", and "who" to generate original data of the corresponding frame for the first time, and hence it is necessary to hold the value even in the case where the data format of the frame is changed, without modifying the value.

For example, as shown in FIG. 1, in the case where extended UMID data UpSp1 (basic UMID data Up, source pack Sp1) is attached to a given frame by the wireless camera 10, the video material recording apparatus 40 replaces the extended UMID data with U3Sp1 (newly generated basic UMID data U3 and unchanged source pack Sp1) for the frame, and stores the frame together with the extended UMID data into the MXF body of the MXF file.

Figure 4:
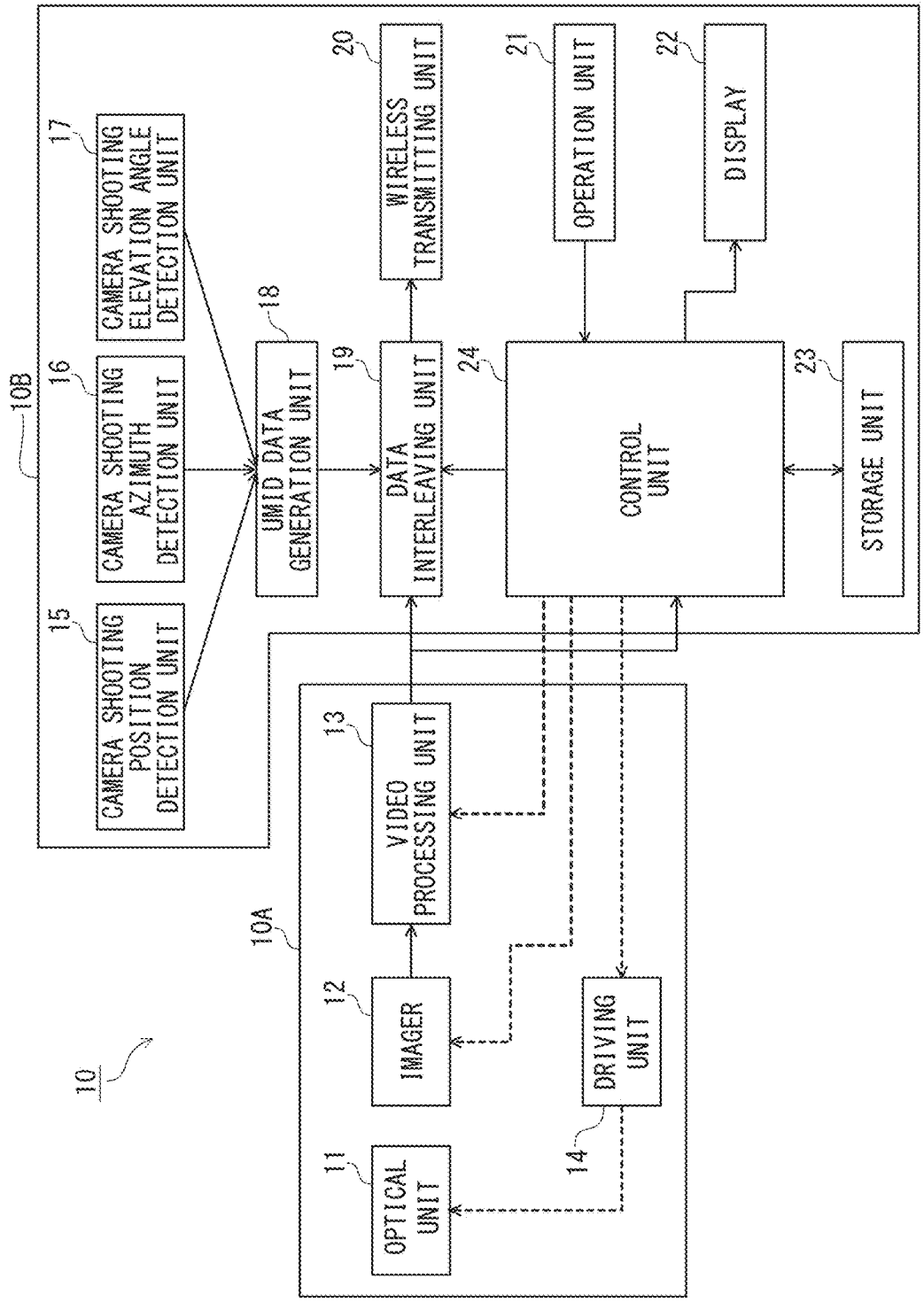
FIG. 4 is a block diagram showing the configuration of a wireless camera.

FIG. 4 is a block diagram showing the configuration of the wireless camera 10. The wireless camera 10 includes an imaging unit 10A and a transmitting unit 10B.

The imaging unit 10A has an optical unit 11, an imager 12, a video processing unit 13, and a driving unit 14. The transmitting unit 10B has a camera shooting position detection unit 15, a camera shooting azimuth detection unit 16, a camera shooting elevation angle detection unit 17, a UMID data generation unit 18, a data interleaving unit 19, a wireless transmitting unit 20, an operation unit 21, a display 22, a storage unit 23, and a control unit 24. Electric power is supplied to each unit of the wireless camera 10 from a battery which is not shown.

The optical unit 11 forms a subject image on an imaging surface of the imager 12, and includes optical components such as a lens and a diaphragm which are not shown. The driving unit 14 controls the position of the lens and the opening amount of the diaphragm according to control by the control unit 24. The imager 12 is an image sensor which includes a large number of photoelectric conversion elements corresponding to pixels, and outputs image data corresponding to the brightness of the subject image formed on the imaging surface. The video processing unit 13 executes signal processing such as gain adjustment and compression encoding on the image data outputted from the imager 12, and supplies the image data having been subjected to the signal processing to the transmitting unit 10B as video data.

The camera shooting position detection unit 15 is, e.g., a global positioning system (GPS) receiving unit, and measures the camera shooting position (altitude, latitude, and longitude) of the wireless camera 10 in real time, and supplies obtained camera shooting position information to the UMID data generation unit 18. The camera shooting azimuth detection unit 16 is, e.g., an electronic compass, and measures the camera shooting azimuth of the wireless camera 10 in real time, and supplies obtained camera shooting azimuth information to the UMID data generation unit 18. The camera shooting elevation angle detection unit 17 is, e.g., a gyroscope sensor, and measures the camera shooting elevation angle of the wireless camera 10 in real time, and supplies obtained camera shooting elevation angle information to the UMID data generation unit 18.

The UMID data generation unit 18 generates the extended UMID data to be attached to each frame. Specifically, the UMID data generation unit 18 generates "where" information of the source pack by using the camera shooting position information supplied from the camera shooting position detection unit 15. In addition, the UMID data generation unit 18 generates "when" information and "who" information of the source pack by using an internal clock which is not shown and user information preset in the wireless camera 10, respectively. Subsequently, the UMID data generation unit 18 generates the extended UMID data by combining the "when" information, the "where" information, and the "who" information of the source pack with the basic UMID data which is pre-assigned to the wireless camera 10 or which is generated at power-on of the wireless camera 10 or the like, and supplies the extended UMID data to the data interleaving unit 19.

The data interleaving unit 19 performs interleaving of the video data supplied from the video processing unit 13 and the extended UMID data supplied from the UMID data generation unit 18. Specifically, the data interleaving unit 19 attaches the corresponding extended UMID data to each frame of the frame sequence having been subjected to the compression encoding by the video processing unit 13, and supplies the frame sequence having interleaved with the extended UMID data to the wireless transmitting unit 20.

The wireless transmitting unit 20 wirelessly connects to the wireless video receiving apparatus 30 based on the control by the control unit 24, and transmits the video data supplied from the data interleaving unit 19 to the wireless video receiving apparatus 30.

The operation unit 21 has a release switch and a menu setting button both of which are not shown, and supplies operation input information based on the operation of a user to the control unit 24.

The display 22 functions as an electronic finder at the time of camera shooting, and displays the subject image in real time based on the video data supplied from the video processing unit 13. In addition, the display 22 also functions as a touch screen, and supplies the operation input information corresponding to a touch operation of the user performed on a display screen as a user interface to the control unit 24.

The storage unit 23 stores a control program of the control unit 24. The storage unit 23 may record the video data outputted from the video processing unit 13 via the control unit 24.

The control unit 24 reads the control program from the storage unit 23, and executes the control of each unit such as the video processing unit 13, the driving unit 14, or the UMID data generation unit 18 based on the read control program and the operation input information from the operation unit 21 or the display 22.

Figure 5:
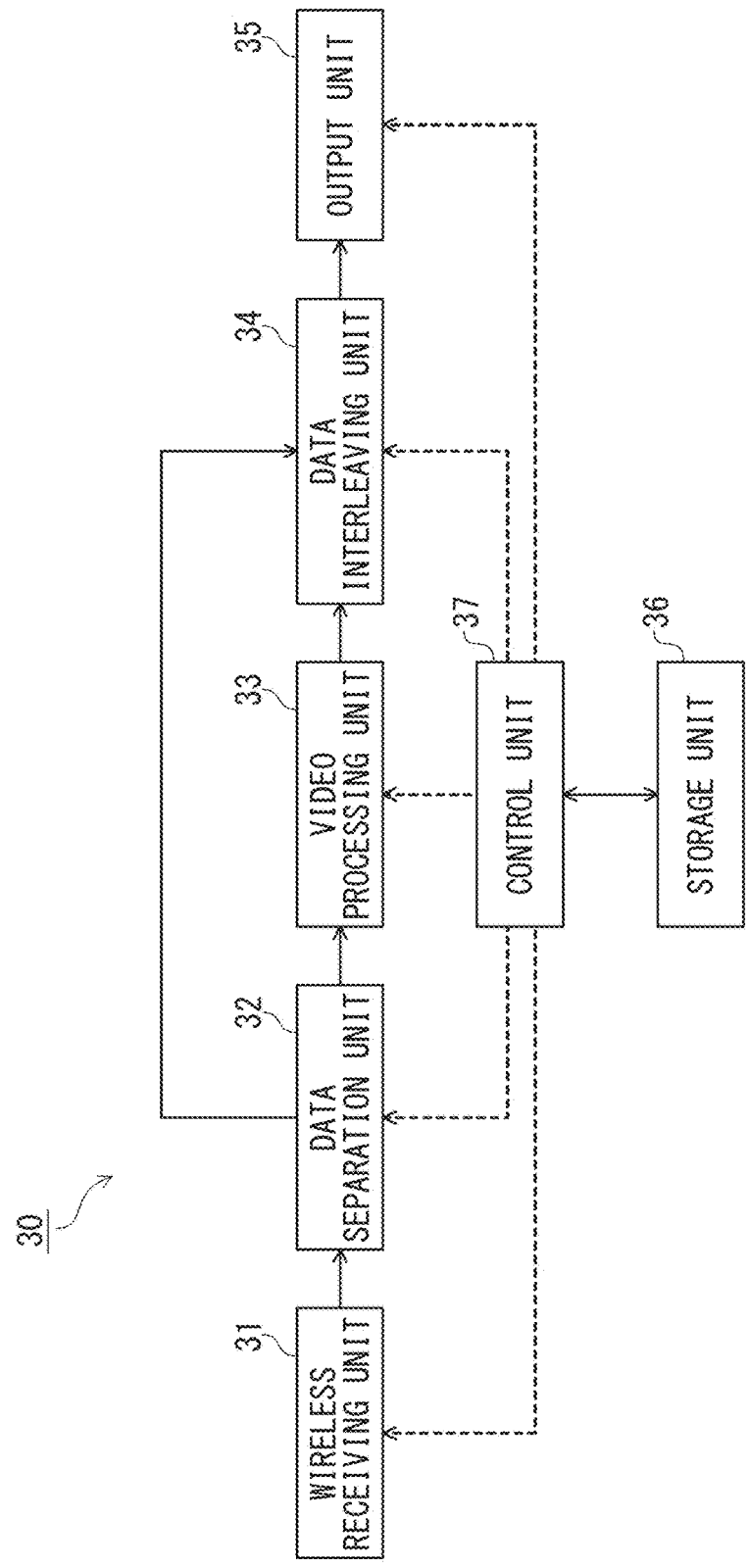
FIG. 5 is a block diagram showing the configuration of a wireless video receiving apparatus.

FIG. 5 is a block diagram showing the configuration of the wireless video receiving apparatus 30. The wireless video receiving apparatus 30 has a wireless receiving unit 31, a data separation unit 32, a video processing unit 33, a data interleaving unit 34, an output unit 35, a storage unit 36, and a control unit 37.

The wireless receiving unit 31 wirelessly connects to the wireless camera 10 according to the control by the control unit 37, receives the video data transmitted from the wireless camera 10, and supplies the video data to the data separation unit 32.

The data separation unit 32 separates the extended UMID data from the video data supplied from the wireless receiving unit 31, supplies the separated extended UMID data to the data interleaving unit 34, and supplies the video data from which the extended UMID data is separated to the video processing unit 33.

The video processing unit 33 converts the video data supplied from the data separation unit 32 to an uncompressed frame sequence by decompression decoding, performs data conversion required for the SDI specification based output for each frame data, and supplies the converted frame data to the data interleaving unit 34.

The data interleaving unit 34 performs interleaving of the extended UMID data supplied from the data separation unit 32 and the video data supplied from the video processing unit 33. Specifically, the data interleaving unit 34 inserts the extended UMID data, which is supplied from the data separation unit 32 and which corresponds to each frame, into the VANC area provided at the each frame included in the uncompressed frame sequence based on the SDI specification, which is supplied from the video processing unit 33.

The output unit 35 outputs to the outside the uncompressed frame sequence with the extended UMID data, which is supplied from the data interleaving unit 34, based on the SDI specification.

The storage unit 36 stores a control program of the control unit 37. The storage unit 36 may record the video data received by the wireless receiving unit 31 via the control unit 37.

The control unit 37 reads the control program from the storage unit 36, and executes the control of each unit in the wireless video receiving apparatus 30 based on the read control program.

Next, the source pack of the extended UMID data will be described in detail.

Figure 6:
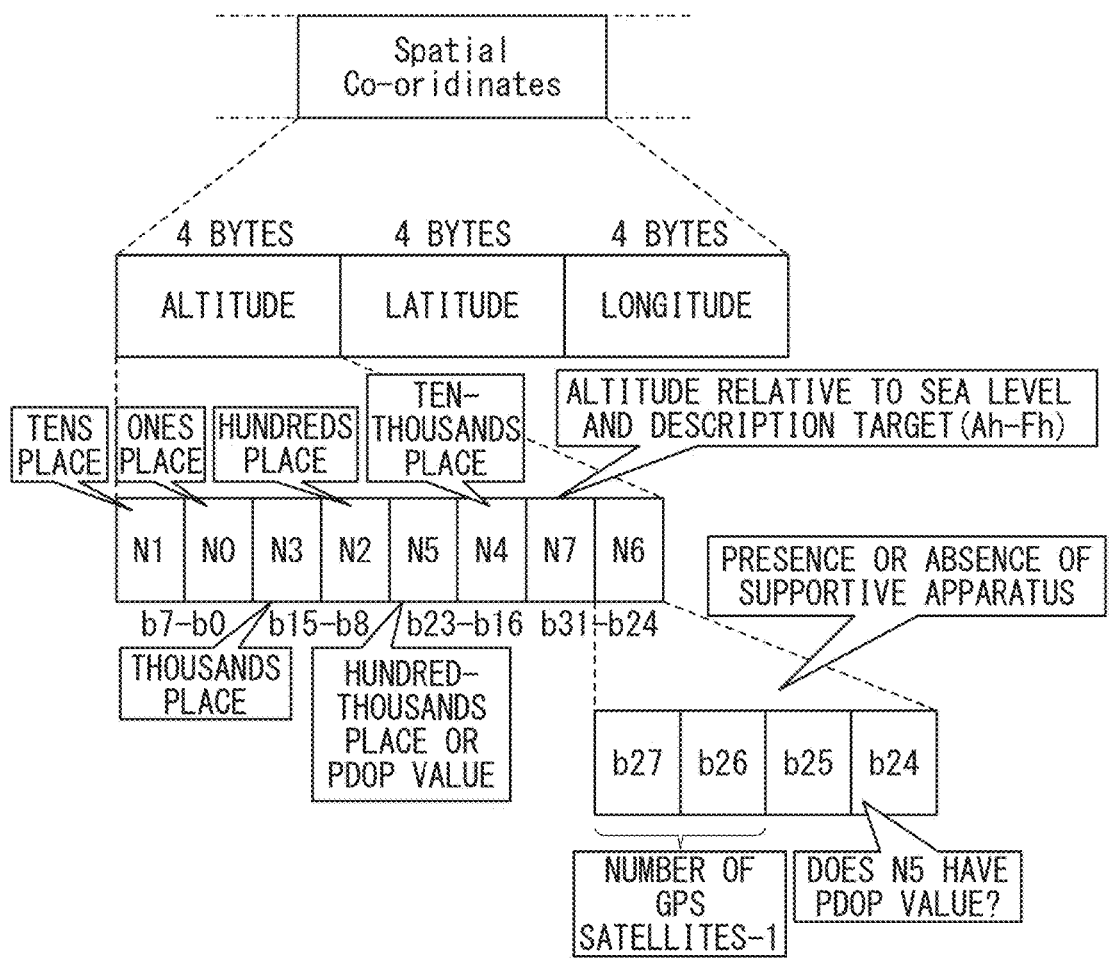
FIG. 6 is a view showing an example of a description at an "altitude" part which is one of elements constituting "Spatial Co-ordinates" of a source pack conforming to a specification of SMPTE ST330.

FIG. 6 is a view showing an example of a description at the "altitude" part serving as one of elements constituting the "Spatial Co-ordinates" element of the source pack conforming to the specification of SMPTE ST330.

The "altitude" part has 4 bytes, and is constituted by 8 nibbles N0, N1, N2, . . . , and N7 each having 4 bits. At each nibble N, the value of any of 0h to 9h is set based on the binary coded decimal coding (hereinafter referred to as BCD code) in principle.

In the extended UMID data including the "altitude" part, a little-endian mode is used as a byte-order. Consequently, for example, the least 2 digits of the altitude value are disposed at the first (left-most) byte of the "altitude" part.

At the most significant nibble N7 of the "altitude" part, the value of any of Ah to Fh is set in order to indicate that the "altitude" part represents an altitude relative to the sea level of the local geoid. Specifically, for the most significant nibble N7, the value of any of Ah to Fh is selected according to whether the altitude has a positive value or a negative value as well as the description target of the source pack. For example, in the case where the description target of the source pack is the camera during camera shooting (camera shooting position), Ah is specified at the most significant nibble N7 when the altitude has the positive value, and Dh is specified at the most significant nibble N7 when the altitude has the negative value.

The nibble N6 subsequent to the most significant nibble N7 is constituted by 4 bits which are b27, b26, b25, and b24 arranged from the higher-order side (left-most side). The most significant 2 bits of the nibble N6 or, b27 and b26, indicate the number of GPS satellites (a value obtained by subtracting one from the actual number of GPS satellites) from which signals have been received at the time of camera shooting position detection. The bit b25 of the nibble N6 indicates whether a supportive apparatus (e.g., a gyroscope) is additionally used for the camera shooting position detection. The least significant bit b24 of the nibble N6 indicates whether the value set at the nibble N5 subsequent to the nibble N6 indicates the first digit of the altitude value (in the case when b24=0b is specified), or a position dilution of precision (PDOP) value for the present camera shooting position detection (in the case when b24=1b is specified).

The PDOP value is a value indicative of positioning precision of the camera shooting position. The positioning precision of the camera shooting position is highest when PDOP=1 is satisfied, and the positioning precision thereof becomes lower as the PDOP value increases from 1.

The nibbles N4 to N0 indicate the last 5 digits of the altitude value based on the BCD code.

For example, in the case where the camera shooting position is detected based on signals from four GPS satellites (which is the minimum number of GPS satellites required to obtain accurate values of three-dimensional spatial coordinates and signal reception time), the supportive apparatus is not used (b25=0b), and the nibble N5 is used for the first digit of the altitude value (b24=0b), Ch (=1100b) is specified at the nibble N6. In this case, the nibble N5 is used for the first digit of the altitude value, and hence the "altitude" part indicative of the altitude relative to the sea level of the local geoid has a value in a range of −999,999 m to +999,999 m.

On the other hand, in the case where the camera shooting position is detected based on signals from three GPS satellites (which is the minimum number of GPS satellites required to obtain approximate values of the three-dimensional spatial coordinates), the supportive apparatus is used to improve the positioning precision (b25=1b), and the nibble N5 is used for the PDOP value (b24=1b), Bh (=1011b) is specified at the nibble N6. In this case, the nibble N5 is used for the PDOP value, and hence the "altitude" part indicative of the altitude relative to the sea level of the local geoid has a value in a range of −99,999 m to +99,999 m.

Incidentally, as described above, in order to detect the camera shooting position correctly, it is necessary to receive the signals from at least three GPS satellites. The PDOP value is significant only when it is used in such a situation.

On the other hand, in the case where the number of the GPS satellites from which the signals have been received is not more than two (b27b26=00b or 01b), even when the nibble N5 is used for the PDOP value (b24=b), the PDOP value is meaningless (invalid). In other words, as long as the nibble N6 conforms to bit allocation specified by SMPTE ST330, the nibble N6 does not have the value of any of 1h (=0001b), 3h (=0011b), 5h (=0101b), and 7h (=0111b).

In addition, in the case when 1h is set at the nibble N6, SMPTE ST330 specifies that it indicates "The measurement has been obtained by the GPS system, but that the result is not valid and could at best be that held over from the last successful capture". In view of the foregoing, in SMPTE ST330, the nibble N6 does not have the value of any of 3h, 5h, and 7h.

Consequently, in the present embodiment, the following setting is performed at the nibble 6 by using a value which is not used in SMPTE ST330 (i.e., the value of 3h or 5h).

Figure 7:
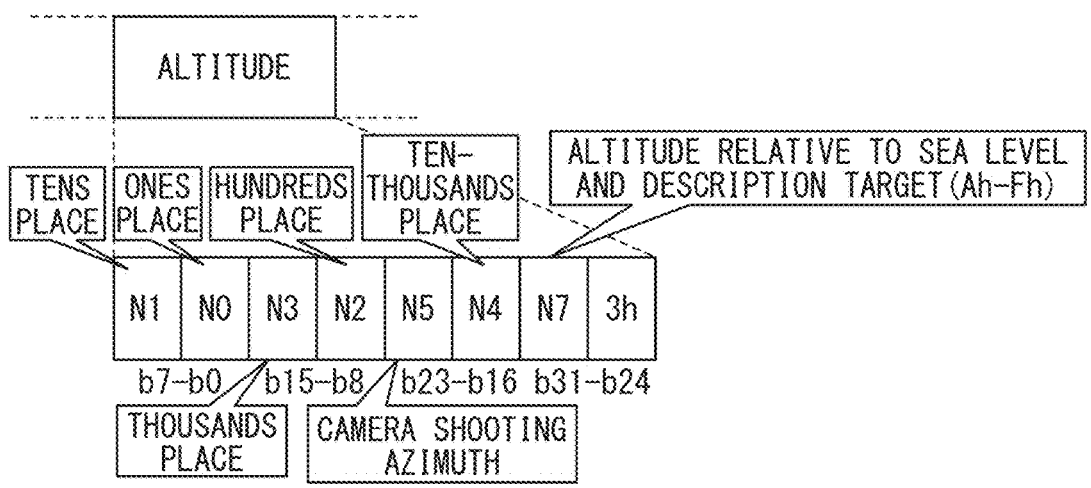
FIG. 7 is a view showing an example of the description at an "altitude" part in the case when 3h is set at a nibble N6.
Figure 8:
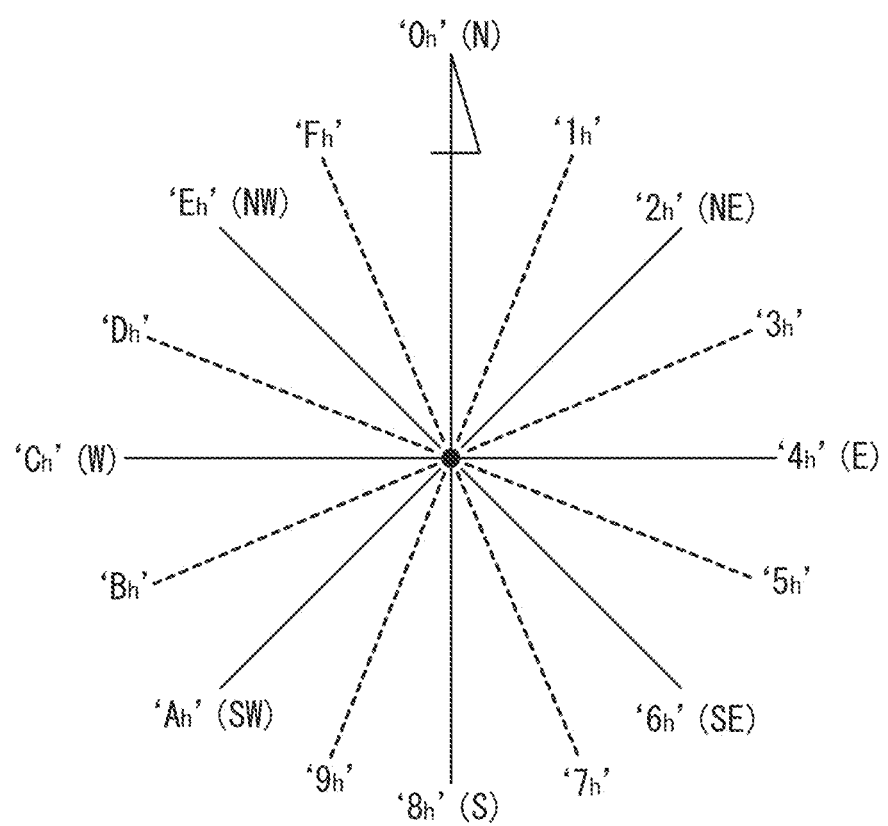
FIG. 8 is a view showing assigned values of a camera shooting azimuth.

FIG. 7 is a view showing an example of the description by the "altitude" part in the case when 3h is set at the nibble N6. FIG. 8 is a view showing assigned values of the camera shooting azimuth.

In the case when 3h is set at the nibble N6, the assigned value corresponding to the camera shooting azimuth (see FIG. 8) is described by the nibble N5. For example, 0h is used for the nibble N5 in the case when the camera shooting azimuth is north (N), and 2h is used for the nibble N5 in the case when the camera shooting azimuth is northeast (NE). Thus, in the "altitude" part of the source pack, the altitude in a range of −99,999 m to +99,999 m and the camera shooting azimuth are described at the same time.

In FIG. 8, each of representative camera shooting azimuths (16 azimuths) is associated with a predetermined assigned value. Actually, the camera shooting azimuths included in a range of ±11.25 degrees with respect to a predetermined camera shooting azimuth is represented by the same assigned value. For example, in the case where the camera shooting azimuth is defined using a clockwise rotation angle with respect to a north azimuth, the assigned value to any of the camera shooting azimuths included in a range of −11.25 degrees to +11.25 degrees is always "0h". Note that camera shooting azimuth table data representing a correspondence between the range of each of the camera shooting azimuths (16 azimuths) and the assigned values is stored in the UMID data generation unit 18.

Figure 9:
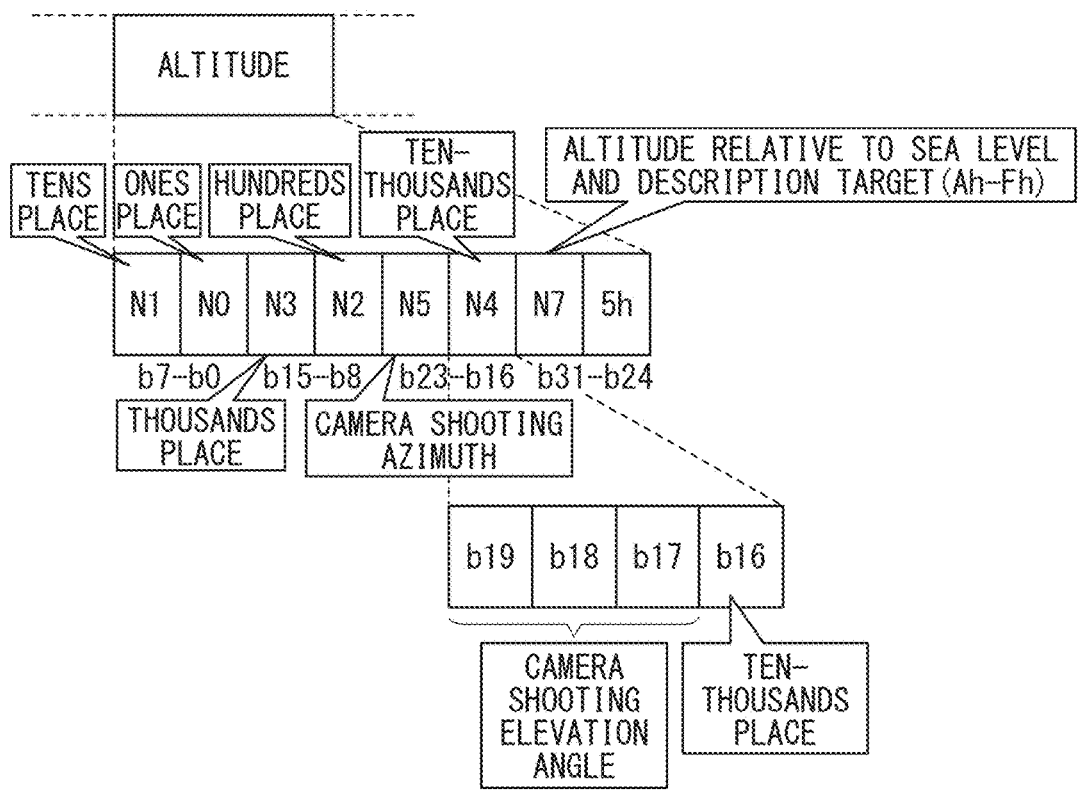
FIG. 9 is a view showing an example of the description at an "altitude" part in the case when 5h is set at the nibble N6.
Figure 10:
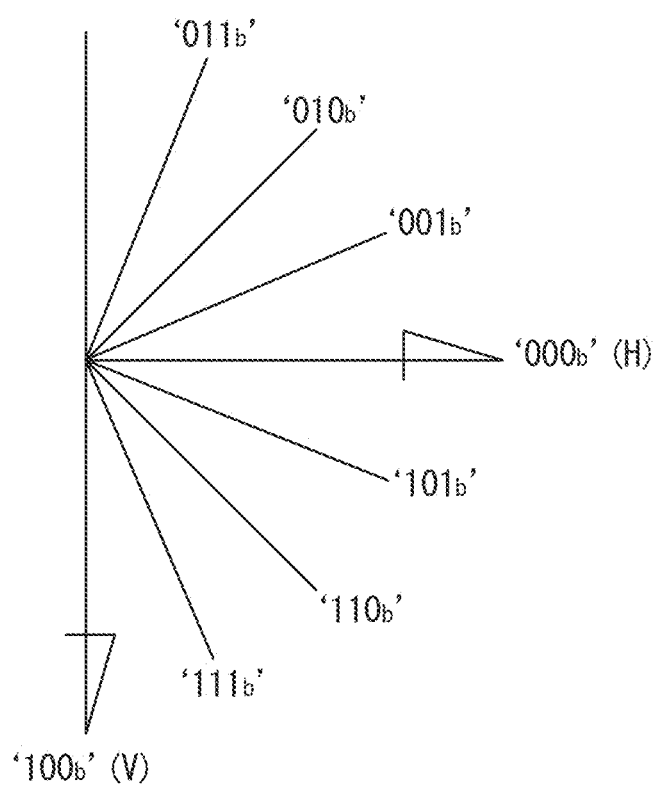
FIG. 10 is a view showing assigned values of a camera shooting elevation angle.

FIG. 9 is a view showing an example of the description by the "altitude" part in the case when 5h is set at the nibble N6. FIG. 10 is a view showing assigned values of the camera shooting elevation angle.

In the case when 5h is set at the nibble N6, similarly to the above case, the assigned value corresponding to the camera shooting azimuth is described by the nibble N5. In addition, by the most significant 3 bits (b19 to b17) of the nibble N4, the assigned value corresponding to the camera shooting elevation angle (see FIG. 10) is described, and the first digit of the altitude is represented by the least significant bit (b16) of the nibble N4. Thus, in the case when 5h is set at the nibble N6, in the "altitude" part of the source pack, the altitude in a range of −19,999 m to +19,999 m, the camera shooting azimuth, and the camera shooting elevation angle are described at the same time.

In FIG. 10, each of representative camera shooting elevation angles is associated with a predetermined assigned value. Actually, the camera shooting elevation angles included in a predetermined range with respect to a predetermined camera shooting elevation angle is represented by the same assigned value. For example, in the case where the camera shooting elevation angle is defined using a counterclockwise rotation angle with respect to a horizontal direction, the assigned value to any of the camera shooting elevation angles included in a range of −11.25 degrees to +11.25 degrees is always "0h". Note that camera shooting elevation angle table data representing a correspondence between the range of each of the camera shooting elevation angles and the assigned values is stored in the UMID data generation unit 18.

Note that, in the case when 5h is set at the nibble N6, as described above, the altitude is limited to the range of −19,999 m to +19,999 m, but there is no practical problem. The reason therefor is that, on the ground where meter-by-meter precision is required, the altitude of Mount Everest, which is the highest mountain in the world, is just 8,848 m, and, even in the air where the meter-by-meter precision is not required, the cruising altitude of a common passenger aircraft is typically at most in a range of 9,000 m to 12,000 m, and hence the actual altitude to be used in practice falls within the above range. Consequently, the altitude defined as shown in FIG. 9 (limited to the range of −19,999 m to +19,999 m) presents no practical problem at the time of the camera shooting on the ground or even in the case where the wireless camera 10 is used in aerial photography.

On the other hand, in each of the "latitude" part and the "longitude" part of the source pack, a measurement value is described with a resolution of 0.00001 degrees based on the BCD code. This resolution corresponds to a resolution of about 1.1 m in a linear distance in the vicinity of the equator. Therefore, judging from a comparison with the resolution of each of the "latitude" part and the "longitude" part, it is appropriate to provide the "altitude" part with the meter-by-meter precision.

In the thus configured video shooting and recording system 1, when the camera shooting of the subject is started, the imaging unit 10A of the wireless camera 10 supplies the image data of the subject to the transmitting unit 10B. The transmitting unit 10B generates the extended UMID data, interleaves the extended UMID data into the image data, and transmits the image data with the extended UMID data to the outside. The following processes are executed when the extended UMID data is generated.

Figure 11:
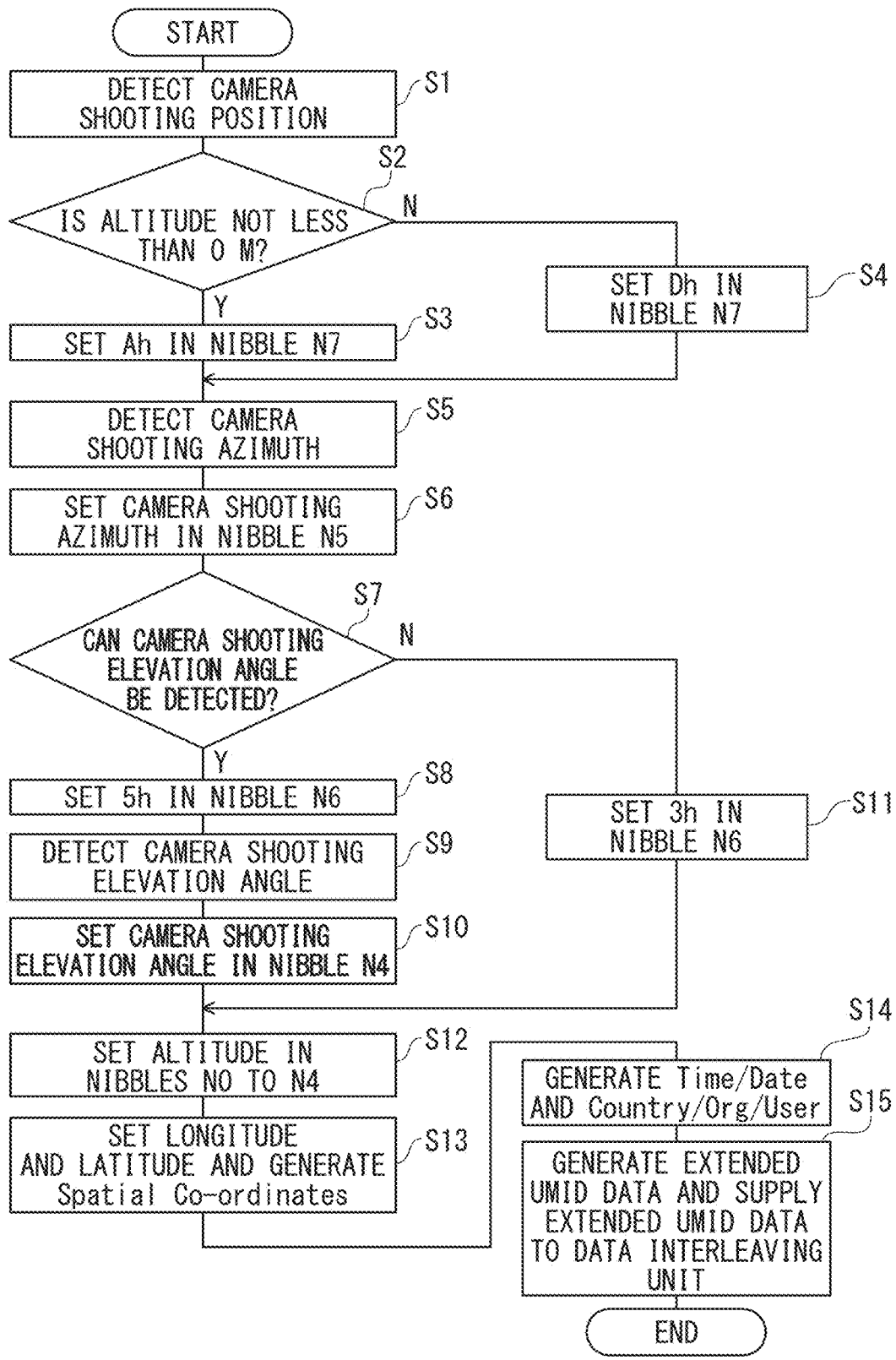
FIG. 11 is a flowchart showing the operation of an extended UMID data generation routine.

FIG. 11 is a flowchart showing the operation of an extended UMID data generation routine. The present routine is executed for each target frame.

In Step S1, the camera shooting position detection unit 15 measures the camera shooting position of the wireless camera 10 (altitude, latitude, and longitude) in real time, and supplies the obtained camera shooting position information to the UMID data generation unit 18. Subsequently, the routine proceeds to Step S2.

In Step S2, the UMID data generation unit 18 extracts the altitude information indicative of the altitude relative to the sea level of the local geoid from the camera shooting position information, and determines whether or not the altitude value is not less than 0 m. The routine proceeds to Step S3 in the case where the altitude value is not less than 0 m, and the routine proceeds to Step S4 in the case where the altitude value is less than 0 m.

In Step S3, the UMID data generation unit 18 sets Ah, which indicates that the altitude has the positive value, at the nibble N7, the most significant nibble among the nibbles N0 to N7 constituting the "altitude" part. Subsequently, the routine proceeds to Step S5.

In Step S4, the UMID data generation unit 18 sets Dh, which indicates that the altitude has the negative value, at the nibble N7, the most significant nibble among the nibbles N0 to N7 constituting the "altitude" part. Subsequently, the routine proceeds to Step S5.

In Step S5, the camera shooting azimuth detection unit 16 measures the camera shooting azimuth of the wireless camera 10 in real time, and supplies the obtained camera shooting azimuth information to the UMID data generation unit 18. Subsequently, the routine proceeds to Step S6.

In Step S6, the UMID data generation unit 18 refers to the above-described camera shooting azimuth table data, determines the assigned value corresponding to the camera shooting azimuth obtained from the camera shooting azimuth detection unit 16, and sets the assigned value at the nibble N5 of the "altitude" part. Subsequently, the routine proceeds to Step S7.

In Step S7, the UMID data generation unit 18 determines whether or not it is possible to detect the camera shooting elevation angle. The routine proceeds to Step S8 in the case where it is possible to detect the camera shooting elevation angle, and the routine proceeds to Step S11 in the case where it is not possible to detect the camera shooting elevation angle.

In Step S8, the UMID data generation unit 18 sets 5h at the nibble N6 of the "altitude" part. Subsequently, the routine proceeds to Step S9.

In Step S9, the camera shooting elevation angle detection unit 17 measures the camera shooting elevation angle of the wireless camera 10 in real time, and supplies the obtained camera shooting elevation angle information to the UMID data generation unit 18. Subsequently, the routine proceeds to Step S10.

In Step S10, the UMID data generation unit 18 refers to the above-described camera shooting elevation angle table data, determines the assigned value corresponding to the camera shooting elevation angle obtained from the camera shooting elevation angle detection unit 17, and sets the assigned value at the most significant 3 bits (b19 to b17) of the nibble N4 of the "altitude" part. Subsequently, the routine proceeds to Step S12.

In Step S11, the UMID data generation unit 18 sets 3h at the nibble N6 of the "altitude" part. Subsequently, the routine proceeds to Step S12.

In Step S12, the UMID data generation unit 18 sets the altitude value detected in Step S1 in the nibbles N0 to N4 of the "altitude" part based on the BCD code. Note that, in the case where it is possible to detect the camera shooting elevation angle, the UMID data generation unit 18 retains the value previously set at the most significant 3 bits (b19 to b17) of the nibble N4 of the "altitude" part in Step S10. The UMID data generation unit 18 sets 1b at the least significant bit (b16) of the nibble N4 in the case where the altitude value exceeds 10,000 m, and the UMID data generation unit 18 sets 0b at the least significant bit of the nibble N4 in the case where the altitude value does not exceed 10,000 m. With this, even in the case where the altitude value exceeds 10,000 m, the value of the first digit of the altitude (the ten-thousands place) is described in the nibble N4. Subsequently, the routine proceeds to Step S13.

In Step S13, the UMID data generation unit 18 extracts the latitude information and the longitude information from the camera shooting position information detected in Step S1, and sets the extracted latitude information and the extracted longitude information at the "latitude" part and the "longitude" part in the "Spatial Co-ordinates" element shown in FIG. 6. With this, the "Spatial Co-ordinates" element of the extended UMID data is generated. Subsequently, the routine proceeds to Step S14.

In Step S14, the UMID data generation unit 18 generates the "Time/Date" element based on the internal clock, and generates the "Country/Org/User" element based on the user information preset in the wireless camera 10. As a result, the source pack shown in FIG. 2 is generated. Subsequently, the routine proceeds to Step S15.

In Step S15, the UMID data generation unit 18 extracts the basic UMID data which is pre-assigned to the wireless camera 10 or is generated at the power-on of the wireless camera 10 or the like. The UMID data generation unit 18 generates the extended UMID data by coupling the extracted basic UMID data and the obtained source pack described above to each other, and supplies the extended UMID data to the data interleaving unit 19. Subsequently, when the present routine for the target frame is ended, the next frame serves as the target frame, and the procedure in and after Step S1 is executed again.

The data interleaving unit 19 attaches the extended UMID data to each frame supplied from the imaging unit 10A of the wireless camera 10, and supplies the sequence of frames data, into which the extended UMID data is interleaved, to the wireless transmitting unit 20. The wireless transmitting unit 20 transmits the sequence of frames data to the wireless video receiving apparatus 30.

Note that the frequency of update of the camera shooting position detected by the camera shooting position detection unit 15 is at most one second in general. Consequently, with regard to "camera shooting position" of the extended UMID data, frame-by-frame precision to distinguish each frame is not required.

On the other hand, with regard to the "Time/Date" element of the extended UMID data, a value which differs from one frame to another (a value with the temporal resolution smaller than the reciprocal of the frame rate) is required such that each frame can be uniquely distinguished from the other frames.

While the UMID data generation unit 18 determines whether or not it is possible to detect the camera shooting elevation angle for each frame (Step S7), and executes the processes corresponding to the determination result (Steps S8 to S11) in the operation of the extended UMID data generation routine shown in FIG. 11, the operation is not limited to this example.

For example, the UMID data generation unit 18 may omit setting of the camera shooting elevation angle and set only the camera shooting azimuth by omitting Steps S7 to S10 and setting (fixing) "3h" in the nibble N6 (Step S11).

In addition, for example, the UMID data generation unit 18 may always set the camera shooting azimuth and the camera shooting elevation angle by omitting Steps S7 and S11 and setting (fixing) "5h" in the nibble N6 (Step S8). Note that, in the case where the camera shooting elevation angle is not detected, the UMID data generation unit 18 may set the same camera shooting elevation angle as that set for the previous frame (e.g., for the immediately preceding frame).

As described so far, the wireless camera 10 does not set the measurement values of the three elements, i.e., the number of the GPS satellites, the presence or absence of the supportive apparatus, and the position dilution of precision value (PDOP value), at the nibble N6 of the "altitude" part of the extended UMID data standardized by SMPTE. Instead, the wireless camera 10 sets the value, which indicates that the three elements are invalid and which is not used in SMPTE ST330 (e.g., 3h or 5h), at the nibble N6 thereof. Then, the wireless camera 10 sets the measurement value of the altitude at the nibbles N0 to N4 of the "altitude" part, sets the measurement value of the camera shooting azimuth at the nibble N5 of the "altitude" part, and sets the measurement value of the camera shooting elevation angle at part of the nibble N4 of the "altitude" part.

Consequently, the wireless camera 10 can output the frame data to which the description of the camera shooting azimuth and the camera shooting elevation angle, which are usually more effective in the search and classification of the material data, is added, instead of the description of the number of the GPS satellites, the presence or absence of the supportive apparatus, and the PDOP value. In addition, the wireless camera 10 can still maintain a backward compatibility with the conventional extended UMID data completely by using, for the nibble N6 of the "altitude" part of the extended UMID data, the value indicating that the three elements (the number of the GPS satellites, the presence or absence of the supportive apparatus, and the PDOP value) are invalid as the identification information indicative of the description of the camera shooting azimuth and the camera shooting elevation angle for the frame.

Modification of First Embodiment

The present invention is not limited to the above-described embodiment, and may be applied to various configurations in which design changes are made within the scope of the matters described in the scope of claims.

For example, under the condition that the wireless video receiving apparatus 30 outputs the frame sequence, into which the extended UMID data is interleaved, according to the SDI specification or the like, data communication between the wireless camera 10 and the wireless video receiving apparatus 30 may use a proprietary technology. In other words, under the above condition, details of exchange of data between the wireless camera 10 and the wireless video receiving apparatus 30 do not have to be taken into account.

In this case, the wireless video receiving apparatus 30 may generate and interleave the extended UMID data at the time of the frame sequence output based on the SDI specification. That is, the wireless video receiving apparatus 30 may receive digital video data and information required to generate the extended UMID data (the camera shooting position, the camera shooting azimuth, and the camera shooting elevation angle) wirelessly transmitted from the wireless camera 10, generate the extended UMID data to be attached to each frame, and insert the extended UMID data into the VANC area of the SDI output frame.

The transmission between the wireless video receiving apparatus 30 and the video material recording apparatus 40 is predicated on the SDI, but a protocol is not limited to the SDI as long as both of the wireless video receiving apparatus 30 and the video material recording apparatus 40 are compliant with the protocol. The transmission therebetween may be based on, e.g., Video over Internet Protocol (VoIP).

The wireless camera 10 shown in FIG. 4 is configured integrally with the imaging unit 10A and the transmitting unit 10B, but the configuration of the wireless camera 10 is not limited to the above configuration. For example, the imaging unit 10A and the transmitting unit 10B may also be configured independently in the wireless camera 10.

In addition, each of the camera shooting position detection unit 15, the camera shooting azimuth detection unit 16, and the camera shooting elevation angle detection unit 17 is an optional element of the transmitting unit 10B, and is not an essential element thereof. For example, the transmitting unit 10B may receive information on the camera shooting position, the camera shooting azimuth, and the camera shooting elevation angle from the outside, generate the extended UMID data by using the received information, and interleave the extended UMID data into a separately inputted frame sequence.

Second Embodiment

Next, a second embodiment of the present invention will be described. Note that the same elements as those in the first embodiment are designated by the same reference numerals, and the duplicate description thereof will be omitted.

Figure 12:
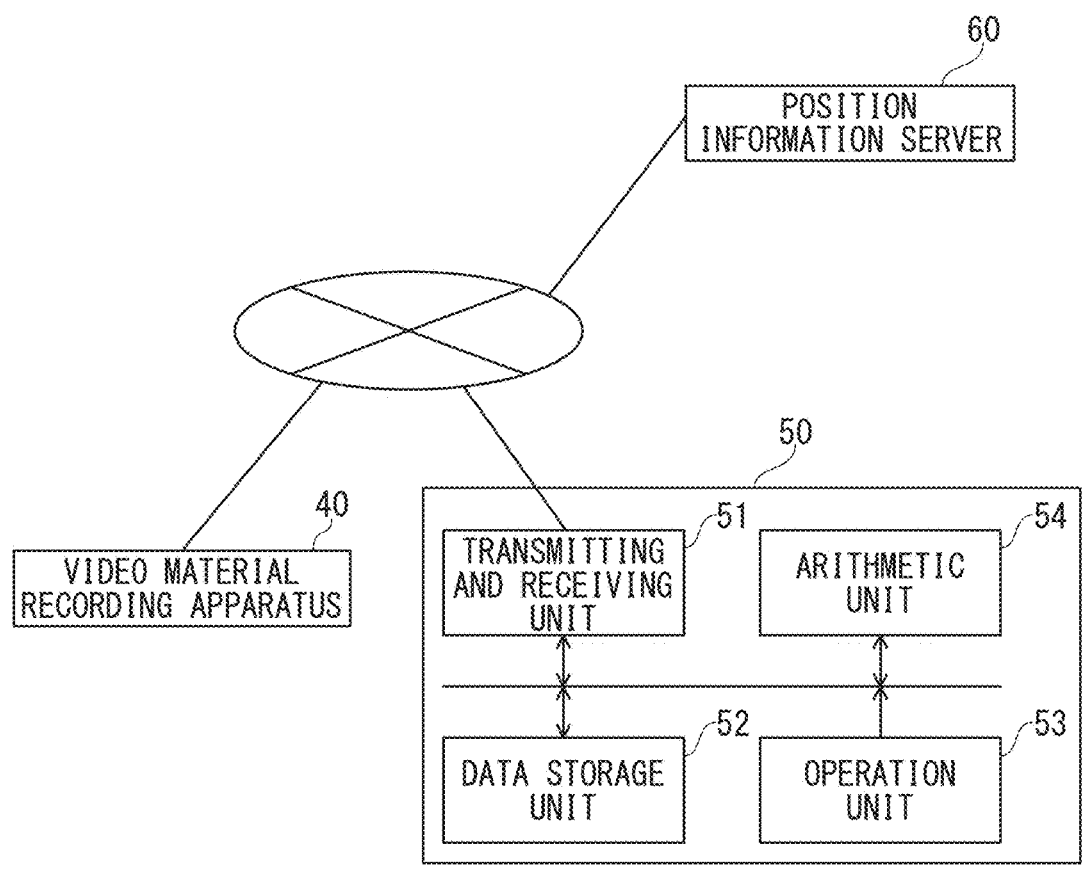
FIG. 12 is a view showing the schematic configuration of a video material search system according to a second embodiment of the present invention.

FIG. 12 is a view showing the configuration of a video material search system 100 according to the second embodiment of the present invention.

The video material search system 100 includes the video material recording apparatus 40 in which the MXF file is recorded, a video material search apparatus 50 which searches for a still image (frame) in which a flying object is imaged from the MXF file recorded in the video material recording apparatus 40, and a position information server 60 which stores time series data of the position of the flying object. Note that, when the video material search apparatus 50 can always use the time series data of the position of the flying object, the position information server 60 can be omitted.

The video material search apparatus 50 includes a transmitting and receiving unit 51 which performs transmission and reception of data with an external apparatus such as the video material recording apparatus 40 via a communication line, a data storage unit 52 which stores received data, an operation unit 53 to which the operation information of the user is inputted, and an arithmetic unit 54 which performs frame search and other arithmetic processing.

The video material search apparatus 50 searches for the frame in which the flying object is imaged from various pieces of the material data (frame sequence) recorded as MXF files in the video material recording apparatus 40.

Figure 13:
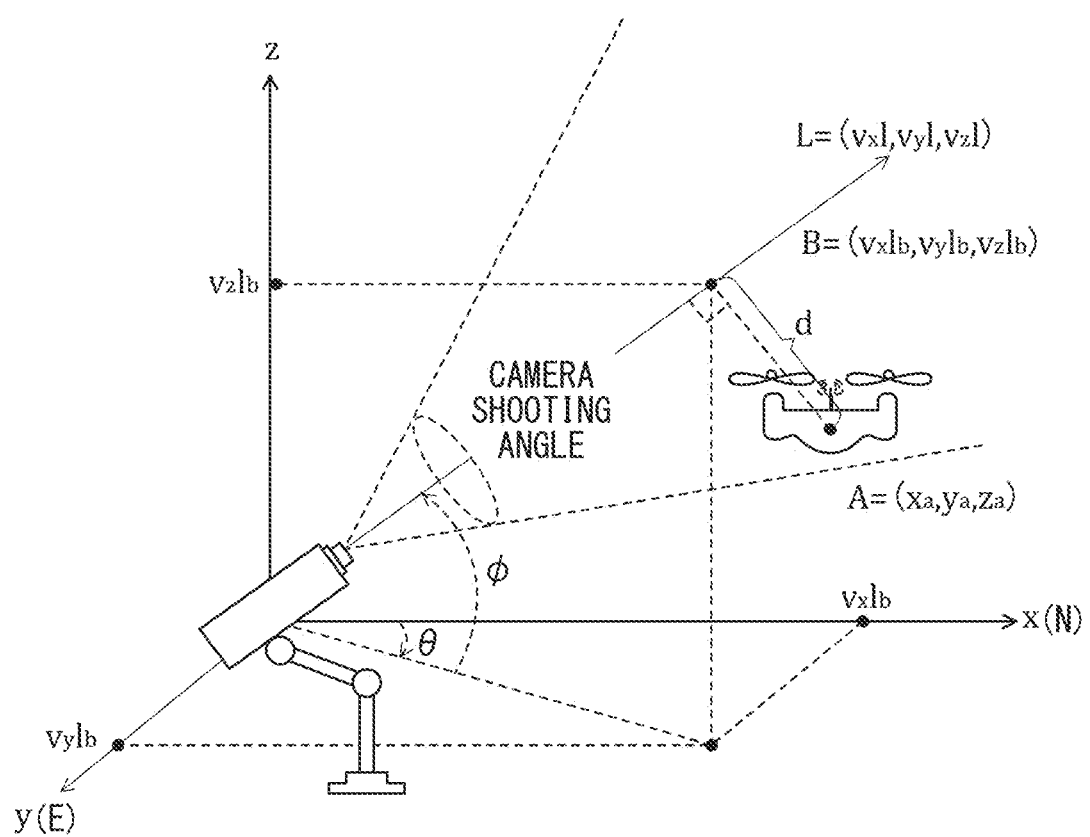
FIG. 13 is a view for explaining a search method of a frame in which a flying object is imaged.

FIG. 13 is a view for explaining a search method of the frame in which the flying object is imaged. In FIG. 13, a north (N) direction, an east (E) direction, and a height direction are set as an x axis, a y axis, and a z axis, respectively, in a left-handed three-dimensional orthogonal coordinate system which has the x, y, and z axes, and uses a position of a camera for shooting the flying object as an origin O. At a given time $t_0$, a camera shooting direction of the camera is represented by a line $L=(v_x l, v_y l, v_z l)$ (l: any constant), and the flying object is present at a position $A=(x_a, y_a, z_a)$.

The flying object is equipped with a GPS receiving unit, measures the position A in a geographic coordinate system in real time, and transmits the measurement result to the position information server 60. Consequently, in the position information server 60, time series data indicative of the position A in the geographic coordinate system and its time is stored. The video material search apparatus 50 can access the position information server 60, and can use the time series data related to the position A of the flying object.

Herein, $(v_x, v_y, v_z)$ of the line L is a unit vector representing the camera shooting direction of the camera at the time $t_0$ (hereinafter referred to as a camera shooting direction vector), and is a concept which includes "camera shooting azimuth" and "camera shooting elevation angle".

It is possible to determine whether the camera was shooting the flying object at the time $t_0$ by determining whether the flying object was present in a camera shooting angle of view of the camera at the time $t_0$. In other words, when a distance d between the position A of the flying object and the line L representing the camera shooting direction of the camera has a value less than a predetermined threshold value Dth which is determined according to the camera shooting angle of view at the time $t_0$, it is determined that the flying object was present within the camera shooting angle of view of the camera, and thus it is also determined that the camera was shooting the flying object.

When an intersection of a perpendicular dropped from the position A to the line L is defined as $B=(v_x l_b, v_y l_b, v_z l_b)$, from the Pythagorean theorem, $|AB|^2 = d^2$ is represented by the following formula.

$$d^2 = (x_a^2 + y_a^2 + z_a^2) - l_b^2 \quad (1)$$

A segment AB is perpendicular to the camera shooting direction vector (vx, vy, vz), and hence lb is represented by the following formula.

$$l_b = v_x x_a + v_y y_a + v_z z_a$$

In addition, when the camera shooting direction vector (vx, vy, vz) is represented by using polar coordinates $(\theta, \phi)$ which share the origin O of the three-dimensional orthogonal coordinates, the following formulas are satisfied.

$$v_x = \cos \phi \cdot \cos \theta$$

$$v_y = \cos \phi \cdot \sin \theta$$

$$v_z = \sin \phi$$

Herein below, the above three formulas are referred to as coordinate transformation formulas.

Consequently, at the time t0, when the position A of the flying object=(xa, ya, za) and the camera shooting direction $(\theta, \phi)$ of the camera are given, it is possible to determine the distance d based on the above formula (1). In the case where the distance d is less than the threshold value Dth, it is possible to determine that the camera was shooting the flying object at the time t0, i.e., the flying object is imaged in the frame at the time t0.

Note that the time $t_0$ is a value set in the "Time/Date" element of the extended UMID data (see FIG. 2) in the MXF file (material data) recorded in the video material recording apparatus 40. With regard to the values of the polar coordinates $(\theta, \phi)$ indicative of the camera shooting direction of the camera, the assigned values (hexadecimal values shown in FIGS. 8 and 10) set at "camera shooting azimuth" and "camera shooting elevation angle" in the "altitude" part of the extended UMID data are converted to the representative values associated with the assigned values (e.g., in the case of "camera shooting azimuth", any of 0 degrees, 22.5 degrees, 45 degrees, . . . , and 337.5 degrees).

In the present embodiment, the camera shooting azimuth $\theta$ and the camera shooting elevation angle $\phi$ are representative values determined from the assigned values of "camera shooting azimuth" and "camera shooting elevation angle" shown in FIGS. 8 and 10, respectively. Consequently, as shown in FIG. 13, in the polar coordinates $(\theta, \phi)$, a coordinate which is based on the left-handed three-dimensional orthogonal coordinate system different from a common polar coordinate system (based on a right-handed three-dimensional orthogonal coordinate system in which a counterclockwise direction is a forward direction) is used as $\theta$, for which a clockwise direction is defined as the forward direction. In addition, with regard to $\phi$, the counterclockwise direction relative to an xy plane is defined as the forward direction.

The position A of the flying object=$(x_a, y_a, z_a)$ is a relative position with respect to the camera shooting position of the camera as the origin O. On the other hand, as shown in FIG. 2, the actual camera shooting position of the camera is represented by the "altitude" part, the "longitude" part, and the "latitude" part, which are based on the geographic coordinate system. Consequently, the position A of the flying object is obtained by correcting an actual position of the flying object in the geographic coordinate system actually measured at the time $t_0$ by using the origin O (the camera shooting position of the camera) in the three-dimensional orthogonal coordinate system as a reference. Note that the correction method of the position of the flying object including the coordinate system transformation of the camera shooting position of the camera is publicly known, and hence the detailed description thereof will be omitted.

The threshold value Dth is a value determined according to the camera shooting angle of view of the camera. In the case of a camera which uses a standard lens, the camera shooting angle of view is typically from 25° to 50° in general. Consequently, the threshold value Dth is represented by the following formula.

$$D\text{th} = |OA| \cdot \sin(12.5°) \text{ to } |OA| \cdot \sin(25°)$$

For example, in the case where the distance |OA| between the camera and the flying object is 10 m, the threshold value Dth is from 2 m to 4 m.

In the thus configured video material search system 100, the video material search apparatus 50 searches for the frame in which the flying object is imaged from various pieces of the material data.

Figure 14:
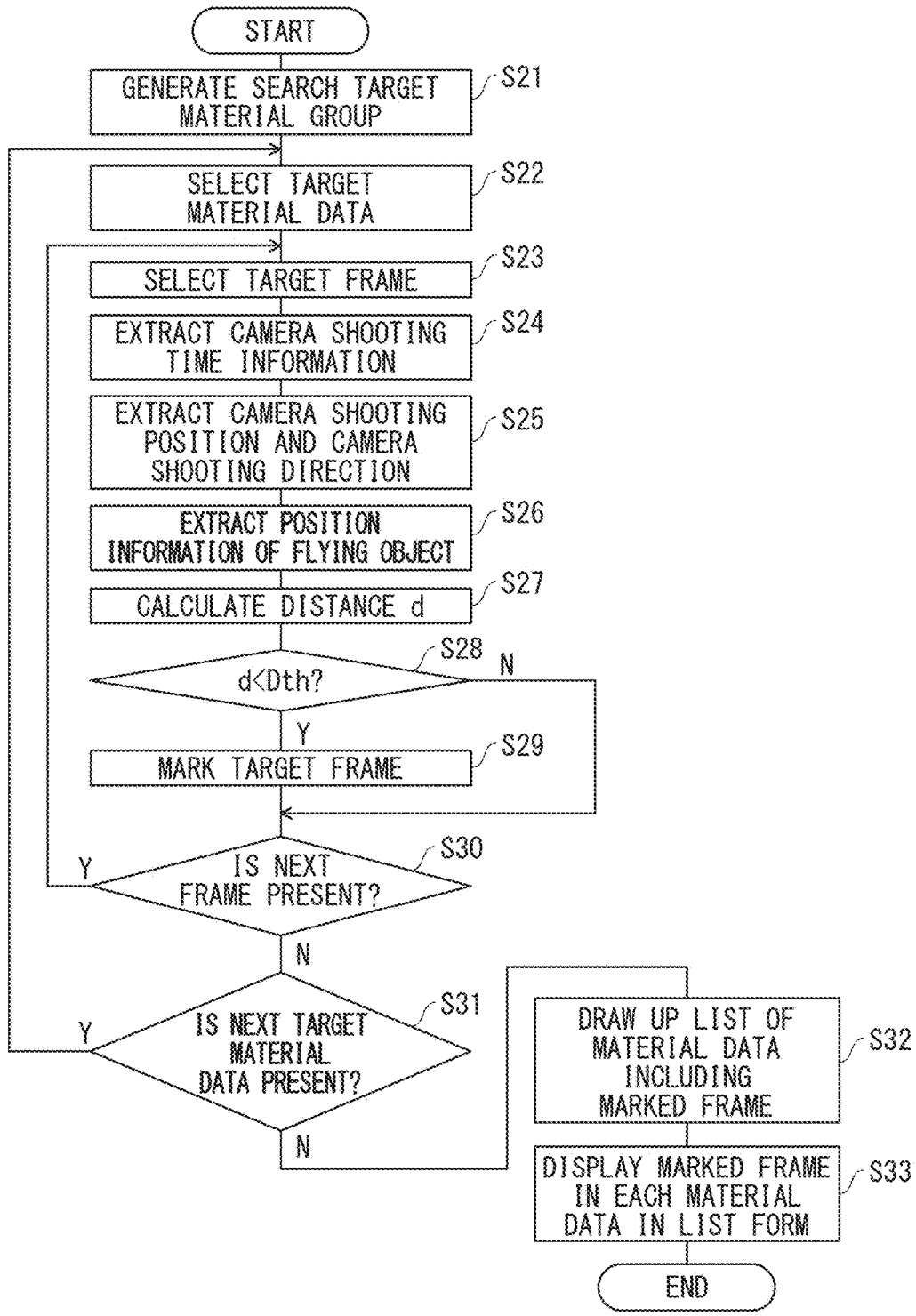
FIG. 14 is a flowchart showing the operation of a video material search routine executed by an arithmetic unit of a video material search apparatus.

FIG. 14 is a flowchart showing the operation of a video material search routine executed by the arithmetic unit 54 of the video material search apparatus 50.

In Step S21, the arithmetic unit 54 gathers a plurality of pieces of the material data in which the flying object may be imaged to generate a search target material group. Specifically, the arithmetic unit 54 accesses the video material recording apparatus 40 via the transmitting and receiving unit 51, and compares information on a camera shooting time and a camera shooting location of the material data in the video material recording apparatus 40 (e.g., the "Time/

Date" element and the "Spatial Co-ordinates" element of the source pack included in the extended TIMID data attached to the first frame of the material data) with information inputted to the operation unit 53 by an operation of a user (an estimated appearance time and an estimated appearance location of the flying object). The arithmetic unit 54 eliminates pieces of the material data in which there is clearly no possibility that the flying object is imaged based on the comparison result, and obtains the search target material group by gathering the remaining pieces of the material data.

In Step S22, the arithmetic unit 54 selects one unselected material data from among pieces of the material data in the search target material group. Hereinafter, the material data selected in the present step is referred to as target material data.

In Step S23, the arithmetic unit 54 selects one unselected frame (the first frame in the case where the frame is selected for the first time) from the frame sequence of the target material data. Hereinafter, the frame selected in the present step is referred to as a target frame.

In Step S24, the arithmetic unit 54 extracts camera shooting time information to of the target frame from the "Time/Date" element included in the extended UMID data attached to the target frame.

In Step S25, the arithmetic unit 54 extracts the camera shooting position information (the origin O in FIG. 13) and camera shooting direction information (the camera shooting direction vector) of the target frame from the "Spatial Co-ordinates" element included in the extended UMID data attached to the target frame.

The camera shooting direction information obtained from the "Spatial Co-ordinates" element includes the camera shooting azimuth θ and the camera shooting elevation angle φ of the camera. Therefore, the camera shooting direction vector is calculated based on the above-described coordinate transformation formulas from the polar coordinates to the three-dimensional orthogonal coordinates.

In Step S26, the arithmetic unit 54 extracts the position A of the flying object in the geographic coordinate system at the time $t_0$ from the position information server 60 by using the camera shooting time information to extracted in Step S24.

The arithmetic unit 54 converts the extracted position A of the flying object in the geographic coordinate system to the position in the three-dimensional orthogonal coordinate system which uses the camera shooting position of the camera as the origin O by using the altitude, the latitude, and the longitude (the camera shooting position of the camera in the geographic coordinate system) described in the source pack attached to the target frame. The transformation of the position A of the flying object and the camera shooting position of the camera from the geographic coordinate system to the three-dimensional orthogonal coordinate system as well as the correction of the position of the flying object itself are well-known techniques, and hence the detailed description thereof will be omitted.

In Step S27, the arithmetic unit 54 calculates the distance d based on the above-described formula (1) by using the camera shooting direction vector calculated in Step S25 and the position A of the flying object in the three-dimensional orthogonal coordinate system which uses the camera shooting position of the camera as the origin O.

In Step S28, the arithmetic unit 54 compares the distance d with the predetermined threshold value Dth. The routine proceeds to Step S29 in the case where d<Dth is satisfied, and the routine proceeds to Step S30 in the case where d<Dth is not satisfied.

In Step S29, the arithmetic unit 54 determines that the flying object is imaged in the target frame, and marks the target frame.

In Step S30, the arithmetic unit 54 determines whether or not an unselected frame (next frame) is present in the target material data. The routine returns to Step S23 in the case where the next frame is present. In the case where the next frame is not present, the frame search (Steps S23 to S30) in the target material data is ended, and the routine proceeds to Step S31.

In Step S31, the arithmetic unit 54 determines whether or not unselected material data (next target material data) is present in the search target material group. The routine returns to Step S22 in the case where the next target material data is present. In the case where the next target material data is not present, the frame search (Steps S22 to S31) of all pieces of the material data in the search target material group is ended, and the routine proceeds to Step S32.

In Step S32, the arithmetic unit 54 selects the material data having at least one marked frame, i.e., the material data having at least one frame in which the flying object is imaged, and draws up a list of the selected material data.

In Step S33, the arithmetic unit 54 identifies the marked frame, i.e., the frame in which the flying object may be imaged, from each material data in the list, and collectively displays the identified frames on a display in list form. With this, only the frame in which the flying object may be imaged, which is selected from various pieces of the material data, is presented to the user.

On the display, for example, downsized images (thumbnails) of the marked frames are arranged and displayed for each material data. In the case where consecutive frames are marked, the thumbnail of a representative frame such as, e.g., a frame which is marked first, is displayed.

Note that the camera shooting position of the camera is fixed in FIG. 13, but the present embodiment is not limited thereto. That is, the camera shooting position of the camera may be movable.

As shown in FIGS. 2 and 3, in the source pack, it is possible to describe "Spatial Co-ordinates" (the camera shooting position of the camera) having a value which differs from one frame to another. Consequently, even in the case where the camera shooting position of the camera always moves, the camera shooting position of the camera is described for each frame in the source pack. In addition, the arithmetic unit 54 of the video material search apparatus 50 extracts the camera shooting position information of the camera for each frame (Step S25 in FIG. 14), and determines the position of the flying object based on the three-dimensional orthogonal coordinate system which uses the camera shooting position of the camera as the origin O (Step S26 in FIG. 14). Consequently, the video material search apparatus 50 can search for the frame, in which the flying object is imaged, without being influenced by whether the camera shooting position of the camera has moved or not.

Incidentally, the second embodiment is based on the precondition that the position information of the flying object is known. However, in reality, the position information of the flying object is unknown in many cases. In these cases, it is not possible to apply the present embodiment to the cases without modifying the embodiment.

However, in the case where even one material data including a frame in which the flying object is imaged is detected by some means, it is possible to estimate an area of the position of presence of the flying object at a time when camera shooting generated the frame by comparing the source pack attached to the frame with the threshold value Dth. Hence, based on the estimated area of the position of presence of the flying object, by setting the threshold value Dth to a relatively large value and applying the present embodiment repeatedly, it becomes possible to narrow down the number of desired material data candidates.

Third Embodiment

Next, a third embodiment of the present invention will be described. Note that the same elements as those described in the above-described embodiments are designated by the same reference numerals, and the duplicate description thereof will be omitted.

Figure 15:
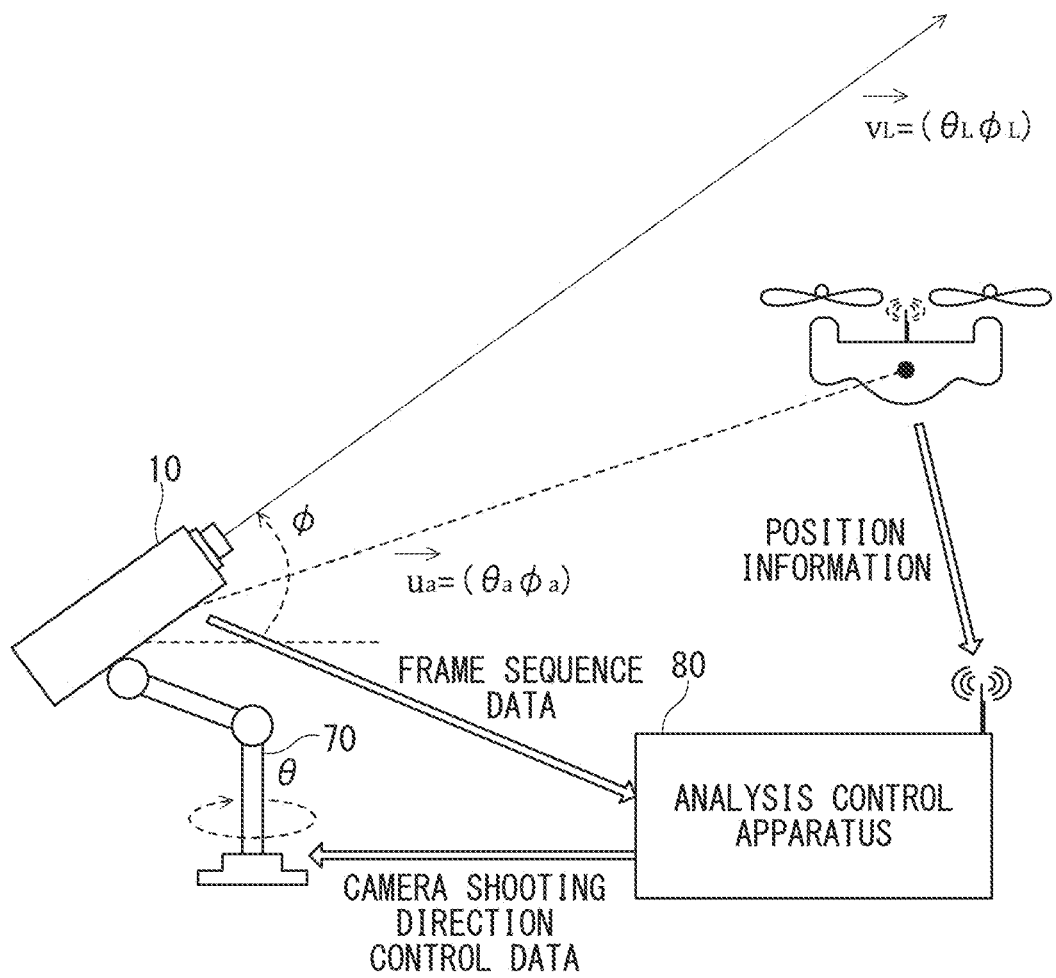
FIG. 15 is a view showing the schematic configuration of an automatic tracking camera shooting system according to a third embodiment of the present invention.

FIG. 15 is a view showing the schematic configuration of an automatic tracking camera shooting system 200 according to the third embodiment of the present invention.

The automatic tracking camera shooting system 200 includes the wireless camera 10 (stationary type) which shoots the flying object, a camera shooting direction control apparatus 70 which controls the camera shooting direction of the wireless camera 10, and an analysis control apparatus 80 which controls the camera shooting direction control apparatus 70 such that the wireless camera 10 automatically tracks the flying object.

FIG. 15 shows the states of the wireless camera 10 and the flying object in the three-dimensional polar coordinate system similar to that used in the second embodiment. At a given time $t_1$, a camera shooting direction vector $v_L$ of the wireless camera 10 is represented by $(\theta_L, \phi_L)$, and a position direction vector $u_a$ of the flying object is represented by $(\theta_a, \phi_a)$. Herein, the position direction vector denotes a unit vector toward the position A of the flying object from the origin O.

The wireless camera 10 shoots the flying object, and wirelessly transmits frame sequence data, into which the extended UMID data is interleaved, to the analysis control apparatus 80. The flying object is equipped with the GPS receiving unit, measures the position information in the geographic coordinate system in real time, and wirelessly transmits the measurement result to the analysis control apparatus 80.

The analysis control apparatus 80 receives the frame sequence data and the position information from the wireless camera 10 and the flying object respectively, generates camera shooting direction control data by performing data analysis, and transmits the camera shooting direction control data to the camera shooting direction control apparatus 70.

The camera shooting direction control apparatus 70 controls the camera shooting azimuth θ and the camera shooting elevation angle ϕ of the wireless camera 10 such that the wireless camera 10 automatically tracks and shoots the flying object based on the camera shooting direction control data received from the analysis control apparatus 80.

Figure 16:
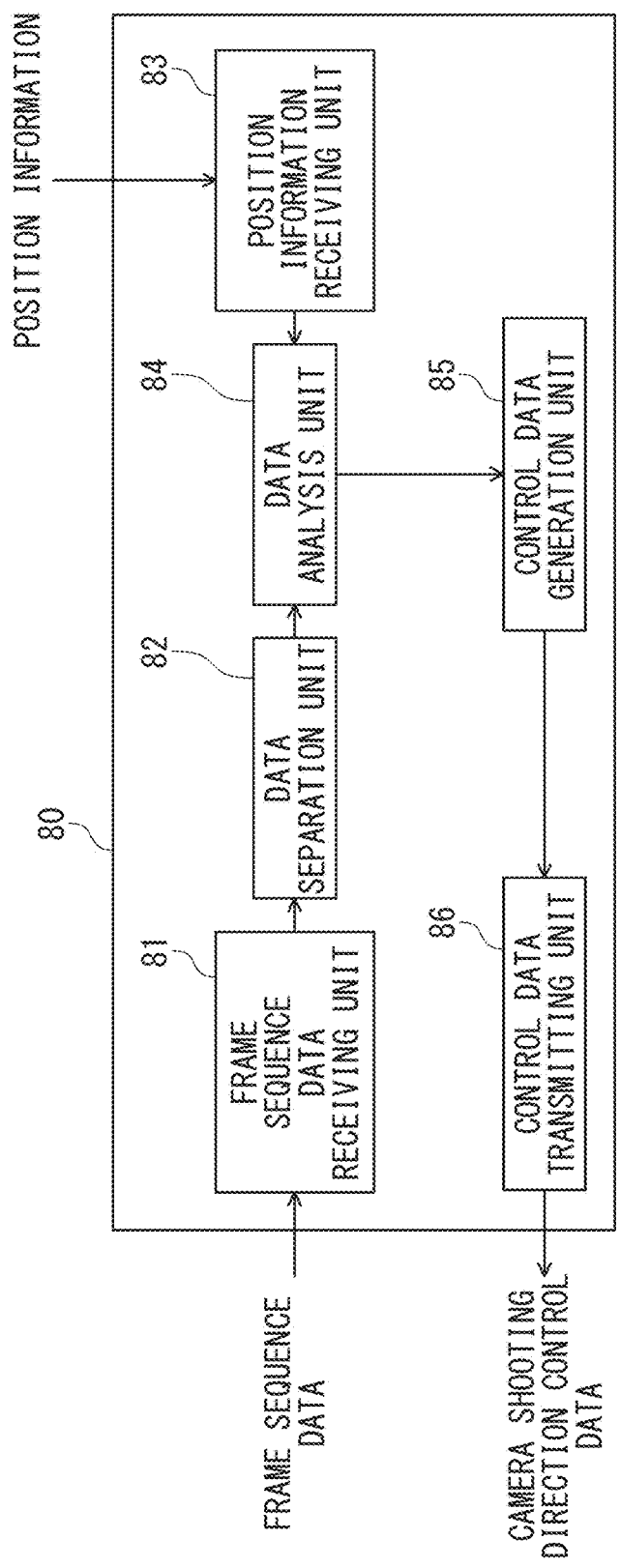
FIG. 16 is a block diagram showing the configuration of an analysis control apparatus.

FIG. 16 is a block diagram showing the configuration of the analysis control apparatus 80.

The analysis control apparatus 80 includes a frame sequence data receiving unit 81, a data separation unit 82, a position information receiving unit 83, a data analysis unit 84, a control data generation unit 85, and a control data transmitting unit 86.

The frame sequence data receiving unit 81 receives the frame sequence data, into which the extended UMID data is interleaved, from the wireless camera 10 in real time, and supplies the received frame sequence data to the data separation unit 82. The data separation unit 82 separates the extended UMID data from the frame sequence data, and supplies the separated extended UMID data to the data analysis unit 84. The position information receiving unit 83 receives current position information from the flying object in real time, and supplies the received current position information to the data analysis unit 84.

The data analysis unit 84 calculates the camera shooting direction vector of the wireless camera 10 and the position direction vector of the flying object by using the extended UMID data and the position information of the flying object. The control data generation unit 85 generates the camera shooting direction control data for the wireless camera 10 to shoot the flying object while automatically tracking the flying object by using the camera shooting direction vector of the wireless camera 10 and the position direction vector of the flying object. The control data transmitting unit 86 transmits the camera shooting direction control data generated by the control data generation unit 85 to the camera shooting direction control apparatus 70.

Figure 17:
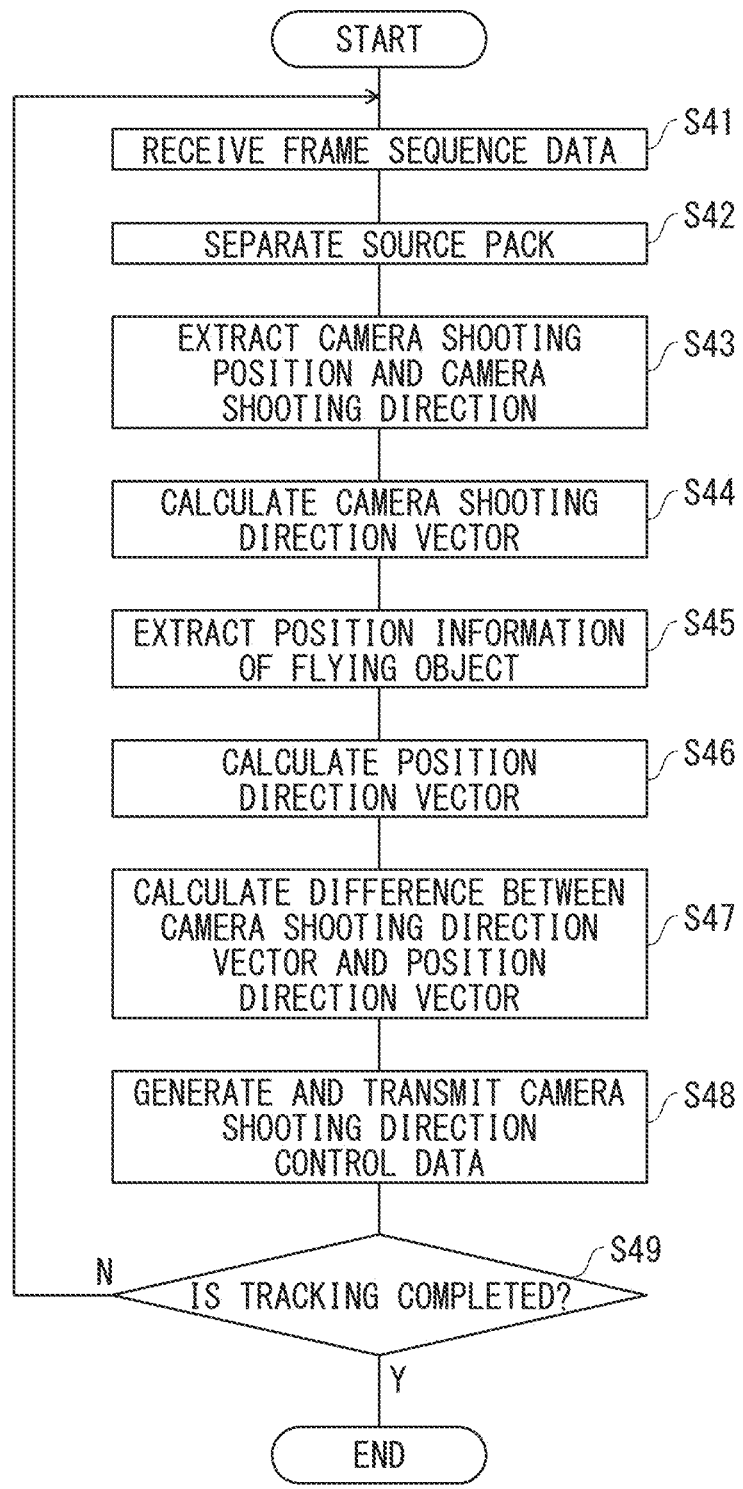
FIG. 17 is a flowchart showing the operation of a control data generation routine by the analysis control apparatus.

FIG. 17 is a flowchart showing the operation of a control data generation routine by the analysis control apparatus 80.

In Step S41, the frame sequence data receiving unit 81 receives the frame sequence data, into which the extended UMID data is interleaved, from the wireless camera 10 in real time, and supplies the received frame sequence data to the data separation unit 82.

In Step S42, the data separation unit 82 separates the extended UMID data from the frame sequence data, further separates the source pack from the extended UMID data, and supplies the separated source pack to the data analysis unit 84.

In Step S43, the data analysis unit 84 extracts the camera shooting time information (e.g., a time $t_1$) of the frame from the "Time/Date" element included in the source pack supplied from the data separation unit 82. In addition, the data analysis unit 84 extracts the camera shooting position information (altitude, latitude, and longitude) and the camera shooting direction information (the camera shooting azimuth and the camera shooting elevation angle) from the "Spatial Co-ordinates" element.

In Step S44, the data analysis unit 84 calculates the camera shooting direction vector $(\theta_L, \phi_L)$ from the extracted camera shooting direction information. Herein, similarly to the second embodiment (FIG. 13), the polar coordinates based on the left-handed three-dimensional orthogonal coordinate system are used. Consequently, with regard to the camera shooting direction vector $(\theta_L, \phi_L)$ the assigned values (hexadecimal values shown in FIGS. 8 and 10) set in "camera shooting azimuth" and "camera shooting elevation angle" in the "altitude" part of the source pack shown in FIG. 9 are converted to the representative values associated with the assigned values (e.g., in the case of "camera shooting azimuth", any of 0 degrees, 22.5 degrees, 45 degrees, . . . , and 337.5 degrees).

In Step S45, the data analysis unit 84 extracts the position information of the flying object in the geographic coordinate system at the time $t_1$ from the time series data of the position information received by the position information receiving unit 83. Subsequently, the data analysis unit 84 converts the extracted position information of the flying object in the geographic coordinate system to the position A in the three-dimensional orthogonal coordinate system which uses the camera shooting position of the wireless camera 10 as the origin O by using the altitude, the latitude, and the longitude (the camera shooting position of the wireless camera 10 in the geographic coordinate system) described in the source pack (at the time $t_1$) separated by the data separation unit 82.

In Step S46, the data analysis unit 84 calculates the position direction vector from the position A of the flying object in the three-dimensional orthogonal coordinate system.

Herein, when it is assumed that the position A of the flying object is represented by $(x_a, y_a, z_a)$ and the position direction vector is represented by $(\theta_a, \phi_a)$, the position direction vector is calculated by the following formula.

$$\theta_a = -\cos^{-1} \frac{x_a}{\sqrt{x_a^2 + y_a^2}}$$ [Math. 1]

$$\phi_a = \sin^{-1} \frac{z_a}{\sqrt{x_a^2 + y_a^2 + z_a^2}}$$

In Step S47, by using the camera shooting direction vector $(\theta L, \phi L)$ calculated in Step S44 and the position direction vector $(\theta a, \phi a)$ calculated in Step S46, the control data generation unit 85 calculates a differential vector $(\Delta\theta, \Delta\phi) = (\theta a - \theta L, \phi a - \phi L)$ which is a difference between the two vectors.

In Step S48, the control data generation unit 85 generates the camera shooting direction control data for controlling the camera shooting azimuth and the camera shooting elevation angle of the wireless camera 10 such that the differential vector $(\Delta\theta, \Delta\phi)$ is to be reduced. The control data transmitting unit 86 transmits the generated camera shooting direction control data to the camera shooting direction control apparatus 70. With this, the camera shooting direction control apparatus 70 controls the camera shooting azimuth and the camera shooting elevation angle of the wireless camera 10 such that the wireless camera 10 automatically tracks and shoots the flying object.

In Step S49, the data analysis unit 84 determines whether or not an instruction to complete automatic tracking and camera shooting of the flying object by the wireless camera 10 is issued. In the case where the instruction to complete the automatic tracking and camera shooting is not issued, the routine returns to Step S41, and a series of processes from Step S42 to Step S48 are performed on the frame which is received next. In the case where the instruction to complete the automatic tracking and camera shooting is issued, the present routine is ended.

Accordingly, the analysis control apparatus 80 calculates the camera shooting direction vector of the wireless camera 10 by using "camera shooting azimuth" and "camera shooting elevation angle" described in the source pack of the extended UMID data, and calculates the position direction vector of the flying object by using the "Spatial Co-ordinates" element (the camera shooting position of the wireless camera 10) described in the source pack. Subsequently, the analysis control apparatus 80 can generate the camera shooting direction control data for the wireless camera 10 to automatically track and shoot the flying object based on the differential vector between the camera shooting direction vector and the position direction vector of the flying object.

Note that the camera shooting position of the wireless camera 10 is fixed in FIG. 15, but the present embodiment is not limited thereto. That is, the camera shooting position of the wireless camera 10 may be movable.

As shown in FIGS. 2 and 3, in the source pack, it is possible to describe "Spatial Co-ordinates" (the camera shooting position of the wireless camera 10) having a value which differs from one frame to another. Consequently, even in the case where the camera shooting position of the wireless camera 10 always moves, the camera shooting position of the wireless camera 10 is described for each frame in the source pack. In addition, the data analysis unit 84 of the analysis control apparatus 80 extracts the camera shooting position information of the wireless camera 10 for each frame (Step S43 in FIG. 17), and determines the position A of the flying object based on the three-dimensional orthogonal coordinate system which uses the camera shooting position of the wireless camera 10 as the origin O (Step S45 in FIG. 17). Consequently, the analysis control apparatus 80 can control the camera shooting direction control apparatus 70 such that the wireless camera 10 automatically tracks and shoots the flying object without being influenced by whether the camera shooting position of the wireless camera 10 has moved or not.

REFERENCE SIGNS LIST

FIG. 1
10 WIRELESS CAMERA
30 WIRELESS VIDEO RECEIVING APPARATUS
40 VIDEO MATERIAL RECORDING APPARATUS
HEADER
BODY
FIG. 2
EXTENDED UMID
BASIC UMID
SOURCE PACK
"WHEN"
"WHERE"
"WHO"
ALTITUDE
LONGITUDE
LATITUDE
FIG. 3
BASIC UMID
SOURCE PACK
FIXED VALUE
CHANGE FROM ONE FRAME TO ANOTHER
FRAME SEQUENCE
FIG. 4
OPTICAL UNIT
12 IMAGER
13 VIDEO PROCESSING UNIT
14 DRIVING UNIT
15 CAMERA SHOOTING POSITION DETECTION UNIT
16 CAMERA SHOOTING AZIMUTH DETECTION UNIT
17 CAMERA SHOOTING ELEVATION ANGLE DETECTION UNIT
18 UMID DATA GENERATION UNIT
19 DATA INTERLEAVING UNIT
20 WIRELESS TRANSMITTING UNIT
21 OPERATION UNIT
22 DISPLAY
23 STORAGE UNIT
24 CONTROL UNIT
FIG. 5
31 WIRELESS RECEIVING UNIT
32 DATA SEPARATION UNIT
33 VIDEO PROCESSING UNIT
34 DATA INTERLEAVING UNIT
35 OUTPUT UNIT
36 STORAGE UNIT
37 CONTROL UNIT

FIG. 6
4 BYTES
ALTITUDE
LATITUDE
LONGITUDE
ALTITUDE RELATIVE TO SEA LEVEL AND DESCRIPTION TARGET
ONES PLACE
TENS PLACE
HUNDREDS PLACE
THOUSANDS PLACE
TEN-THOUSANDS PLACE
HUNDRED-THOUSANDS PLACE OR PDOP VALUE
PRESENCE OR ABSENCE OF SUPPORTIVE APPARATUS
NUMBER OF GPS SATELLITES—1
DOES N5 HAVE PDOP VALUE?
FIG. 7
ALTITUDE
ALTITUDE RELATIVE TO SEA LEVEL AND DESCRIPTION TARGET
ONES PLACE
TENS PLACE
HUNDREDS PLACE
THOUSANDS PLACE
TEN-THOUSANDS PLACE
CAMERA SHOOTING AZIMUTH
FIG. 9
ALTITUDE
ALTITUDE RELATIVE TO SEA LEVEL AND DESCRIPTION TARGET
ONES PLACE
TENS PLACE
HUNDREDS PLACE
THOUSANDS PLACE
TEN-THOUSANDS PLACE
CAMERA SHOOTING AZIMUTH
CAMERA SHOOTING ELEVATION ANGLE
TEN-THOUSANDS PLACE
FIG. 11
START
END
S1 DETECT CAMERA SHOOTING POSITION
S2 IS ALTITUDE NOT LESS THAN 0 M?
S3 SET Ah IN NIBBLE N7
S4 SET Dh IN NIBBLE N7
S5 DETECT CAMERA SHOOTING AZIMUTH
S6 SET CAMERA SHOOTING AZIMUTH IN NIBBLE N5
S7 CAN CAMERA SHOOTING ELEVATION ANGLE BE DETECTED?
S8 SET 5h IN NIBBLE N6
S9 DETECT CAMERA SHOOTING ELEVATION ANGLE
S10 SET CAMERA SHOOTING ELEVATION ANGLE IN NIBBLE N4
S11 SET 3h IN NIBBLE N6
S12 SET ALTITUDE IN NIBBLES N0 TO N4
S13 SET LONGITUDE AND LATITUDE AND GENERATE Spatial Co-ordinates
S14 GENERATE Time/Date AND Country/Org/User
S15 GENERATE EXTENDED UMID DATA AND SUPPLY EXTENDED UMID DATA TO DATA INTERLEAVING UNIT
FIG. 12
40 VIDEO MATERIAL RECORDING APPARATUS
51 TRANSMITTING AND RECEIVING UNIT
52 DATA STORAGE UNIT
53 OPERATION UNIT
54 ARITHMETIC UNIT
60 POSITION INFORMATION SERVER
FIG. 13
CAMERA SHOOTING ANGLE
FIG. 14
START
END
S21 GENERATE SEARCH TARGET MATERIAL GROUP
S22 SELECT TARGET MATERIAL DATA
S23 SELECT TARGET FRAME
S24 EXTRACT CAMERA SHOOTING TIME INFORMATION
S25 EXTRACT CAMERA SHOOTING POSITION AND CAMERA SHOOTING DIRECTION
S26 EXTRACT POSITION INFORMATION OF FLYING OBJECT
S27 CALCULATE DISTANCE d
S29 MARK TARGET FRAME
S30 IS NEXT FRAME PRESENT?
S31 IS NEXT TARGET MATERIAL DATA PRESENT?
S32 DRAW UP LIST OF MATERIAL DATA INCLUDING MARKED FRAME
S33 DISPLAY MARKED FRAME IN EACH MATERIAL DATA IN LIST FORM
FIG. 15
80 ANALYSIS CONTROL APPARATUS
POSITION INFORMATION
CAMERA SHOOTING DIRECTION CONTROL DATA
FRAME SEQUENCE DATA
FIG. 16
81 FRAME SEQUENCE DATA RECEIVING UNIT
82 DATA SEPARATION UNIT
83 POSITION INFORMATION RECEIVING UNIT
84 DATA ANALYSIS UNIT
85 CONTROL DATA GENERATION UNIT
86 CONTROL DATA TRANSMITTING UNIT
POSITION INFORMATION
FRAME SEQUENCE DATA
CAMERA SHOOTING DIRECTION CONTROL DATA
FIG. 17
START
END
S41 RECEIVE FRAME SEQUENCE DATA
S42 SEPARATE SOURCE PACK
S43 EXTRACT CAMERA SHOOTING POSITION AND CAMERA SHOOTING DIRECTION
S44 CALCULATE CAMERA SHOOTING DIRECTION VECTOR
S45 EXTRACT POSITION INFORMATION OF FLYING OBJECT
S46 CALCULATE POSITION DIRECTION VECTOR
S47 CALCULATE DIFFERENCE BETWEEN CAMERA SHOOTING DIRECTION VECTOR AND POSITION DIRECTION VECTOR
S48 GENERATE AND TRANSMIT CAMERA SHOOTING DIRECTION CONTROL DATA
S49 IS TRACKING COMPLETED?

What is claimed is:

1. A camera shooting information generation apparatus for generating extended UMID (Unique Material Identifier) data, the extended UMID data comprising basic UMID data serving as a unique identifier globally identifying material data, and a source pack comprising altitude data including 8 nibbles, wherein first to fifth nibbles of the altitude data indicate last 5 digits of an altitude value relative to a sea level value associated with a local geoid, an eighth nibble of the altitude data indicates whether the altitude value is a positive value or a negative value and what a description target of the source pack is, a seventh nibble of the altitude data indicates: a number of GPS (global positioning system) satellites each serving as a transmission source of a signal received when a camera shooting position of an imaging apparatus is detected; a first flag indicating whether a supportive apparatus is used when the camera shooting position is detected; and a second flag indicating which one of a first digit of the altitude value and a PDOP (position dilution of precision) value of the detected camera shooting position is specified at a sixth nibble of the altitude data, and the sixth nibble of the altitude data indicates either the first digit of the altitude value or the PDOP value according to the second flag, the camera shooting information generation apparatus comprising:
  a fixed value generation unit configured to invalidate the PDOP value indicated at the sixth nibble by generating a first fixed value at the seventh nibble, wherein the first fixed value indicates: the number of the GPS satellites being no more than two; and the second flag indicating the PDOP value is specified at the sixth nibble, and the first fixed value is unused in a format specification of the extended UMID data;
  a camera shooting azimuth value generation unit configured to generate a camera shooting azimuth value of the imaging apparatus at the sixth nibble;
  an altitude value generation unit configured to generate the altitude value; and
  an extended UMID data generation unit configured to generate the extended UMID data using values generated by the fixed value generation unit, the camera shooting azimuth value generation unit, and the altitude value generation unit.

2. The camera shooting information generation apparatus according to claim 1, further comprising:
  a camera shooting elevation angle value generation unit configured to generate a camera shooting elevation angle value of the imaging apparatus,
    wherein the fixed value generation unit invalidates the PDOP value indicated at the sixth nibble by setting, at the seventh nibble, a second fixed value which is different from the first fixed value,
    wherein the second fixed value indicates: the number of the GPS satellites being no more than two; and the second flag indicating the PDOP value is specified at the sixth nibble, and the second fixed value is unused in the format specification of the extended UMID data,
    the altitude value generation unit further configured to generate the altitude value relative to the sea level value associated with the local geoid for less than 20,000 meters,
    the camera shooting elevation angle value generation unit further configured to generate the camera shooting elevation angle value at the most significant 3 bits originally representing numbers from 2 to 9 in a ten-thousands place of the altitude value, and
    the extended UMID data generation unit further configured to generate the extended UMID data using values generated by the fixed value generation unit, the camera shooting azimuth value generation unit, the altitude value generation unit, and the camera shooting elevation angle value generation unit.

3. The camera shooting information generation apparatus according to claim 2, further comprising:
  a camera shooting azimuth detection unit configured to detect the camera shooting azimuth value;
  an altitude detection unit configured to detect the altitude value based on the signal received from each GPS satellite; and
  a camera shooting elevation angle detection unit configured to detect the camera shooting elevation angle value,
    wherein the camera shooting azimuth value generation unit further configured to generate the camera shooting azimuth value detected by the camera shooting azimuth detection unit, the altitude value generation unit further configured to generate the altitude value detected by the altitude detection unit, and the camera shooting elevation angle value generation unit further configured to generate the camera shooting elevation angle value detected by the camera shooting elevation angle detection unit.

4. A camera shooting information generation method for generating extended UMID data, the extended UMID data comprising basic UMID data serving as a unique identifier globally identifying material data, and a source pack comprising altitude data including 8 nibbles, wherein first to fifth nibbles of the altitude data indicate last 5 digits of an altitude value relative to a sea level value associated with a local geoid, an eighth nibble of the altitude data indicates whether the altitude value is a positive value or a negative value and what a description target of the source pack is, a seventh nibble of the altitude data indicates: a number of GPS (global positioning system) satellites each serving as a transmission source of a signal received when a camera shooting position of an imaging apparatus is detected; a first flag indicating whether a supportive apparatus is used when the camera shooting position is detected; and a second flag indicating which one of a first digit of the altitude value and a PDOP (position dilution of precision) value of the detected camera shooting position is specified at a sixth nibble of the altitude data, and the sixth nibble of the altitude data indicates either the first digit of the altitude value or the PDOP value according to the second flag, the camera shooting information generation method comprising:
  invalidating the PDOP value indicated at the sixth nibble by generating a first fixed value at the seventh nibble, wherein the first fixed value indicates: the number of the GPS satellites being no more than two; and the second flag indicating the PDOP value is specified at the sixth nibble, and the first fixed value is unused in a format specification of the extended UMID data;
  generating a camera shooting azimuth value of the imaging apparatus at the sixth nibble;
  generating the altitude value; and
  generating the extended UMID data using the first fixed value, the camera shooting azimuth value and the altitude value.

5. An imaging apparatus comprising:
  an imaging unit configured to image a subject and generate frame sequence data comprising a plurality of frames;
  the camera shooting information generation apparatus according to claim 1; and
  a data interleaving unit configured to interleave the extended UMID data generated by the camera shooting information generation apparatus and the frame sequence data generated by the imaging unit, and to output interleaved frame sequence data.

6. The camera shooting information generation apparatus according to claim 1, the extended UMID data comprising the source pack, wherein the source pack further comprises longitude data and latitude data, each of which including 8 nibbles.

7. A camera shooting information generation method according to claim 4, the extended UMID data comprising the source pack, wherein the source pack further comprises longitude data and latitude data, each of which including 8 nibbles.

* * * * *

UNITED STATES PATENT AND TRADEMARK OFFICE
CERTIFICATE OF CORRECTION

Page 1 of 1

PATENT NO. : 10,547,777 B2
APPLICATION NO. : 15/908518
DATED : January 28, 2020
INVENTOR(S) : Yoshiaki Shibata et al.

It is certified that error appears in the above-identified patent and that said Letters Patent is hereby corrected as shown below:

On the Title Page

Add item (30):
-- (30) Foreign Application Priority Data
      Jan. 1, 2017 (JP)      2017-000001 --

Signed and Sealed this
Fifteenth Day of December, 2020

Andrei Iancu
*Director of the United States Patent and Trademark Office*